(12) United States Patent
Takano et al.

(10) Patent No.: US 9,517,807 B2
(45) Date of Patent: Dec. 13, 2016

(54) VEHICLE

(71) Applicant: Yamaha Hatsudoki Kabushiki Kaisha, Iwata-shi, Shizuoka (JP)

(72) Inventors: Kazuhisa Takano, Shizuoka (JP); Toshio Iizuka, Shizuoka (JP); Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1 day.

(21) Appl. No.: 14/430,376

(22) PCT Filed: Sep. 24, 2013

(86) PCT No.: PCT/JP2013/075619
§ 371 (c)(1),
(2) Date: Mar. 23, 2015

(87) PCT Pub. No.: WO2014/046275
PCT Pub. Date: Mar. 27, 2014

(65) Prior Publication Data
US 2015/0251719 A1     Sep. 10, 2015

(30) Foreign Application Priority Data

Sep. 24, 2012  (JP) .................................. 2012-209873
Jul. 1, 2013   (JP) .................................. 2013-138483

(51) Int. Cl.
*B62K 25/08*     (2006.01)
*B62K 5/08*      (2006.01)
(Continued)

(52) U.S. Cl.
CPC . *B62K 5/08* (2013.01); *B60G 3/01* (2013.01); *B62D 9/02* (2013.01); *B62K 5/027* (2013.01);
(Continued)

(58) Field of Classification Search
CPC ............. B62K 5/08; B62K 5/10; B62K 25/08; B62K 2005/001; B62D 9/02; B62D 5/027; B62D 5/05; B60G 2300/45; B60G 2300/122
See application file for complete search history.

(56) References Cited

U.S. PATENT DOCUMENTS 4,740,004 A    4/1988  McMullen
6,367,824 B1   4/2002  Hayashi
(Continued)

FOREIGN PATENT DOCUMENTS

CN    1386668 A    12/2002
CN    1572644 A    2/2005
(Continued)

OTHER PUBLICATIONS

Hirayama et al.; "Vehicle"; U.S. Appl. No. 14/430,368, filed Mar. 23, 2015.
(Continued)

*Primary Examiner* — Ruth Ilan
(74) *Attorney, Agent, or Firm* — Keating & Bennett, LLP

(57) ABSTRACT

In a vehicle, a size of an acute angle θL defined by a virtual plane perpendicularly or substantially perpendicularly intersecting with an upper axis and a lower axis of a cross member and a up-and-down direction of a vehicle body frame is smaller than sizes of an acute angle θTR and an acute angle θTL which are defined by an expansion and contraction direction of telescopic elements and the up-and-down direction of the vehicle body frame, and an acute angle θSR and an acute angle θSL which are defined by axes of side rods and the up-and-down direction of the vehicle body frame. The sizes of the acute angle θTR and the acute angle θTL are greater than the size of the acute angle θL defined by the virtual plane perpendicularly or substantially perpendicularly intersecting with the upper axis and the lower axis (Continued)

of the cross member and the up-and-down direction of the vehicle body frame, and are equivalent to or smaller than the sizes of the acute angle θSR and the acute angle θSL.

4 Claims, 18 Drawing Sheets

(51) Int. Cl.
| | |
|---|---|
| B62K 5/10 | (2013.01) |
| B62K 5/05 | (2013.01) |
| B60G 3/01 | (2006.01) |
| B62K 5/027 | (2013.01) |
| B62D 9/02 | (2006.01) |
| B62K 21/18 | (2006.01) |
| B62K 5/00 | (2013.01) |

(52) U.S. Cl.
CPC . *B62K 5/05* (2013.01); *B62K 5/10* (2013.01); *B62K 21/18* (2013.01); *B62K 25/08* (2013.01); *B60G 2200/44* (2013.01); *B60G 2204/422* (2013.01); *B60G 2204/8302* (2013.01); *B60G 2300/122* (2013.01); *B60G 2300/45* (2013.01); *B62K 2005/001* (2013.01); *B62K 2202/00* (2013.01)

(56) References Cited

U.S. PATENT DOCUMENTS

| | | |
|---|---|---|
| 7,543,829 B1 | 6/2009 | Barnes |
| 2004/0140645 A1 | 7/2004 | Hayashi |
| 2005/0012291 A1 | 1/2005 | Bagnoli |
| 2005/0093270 A1 | 5/2005 | Wilcox et al. |
| 2005/0167174 A1 | 8/2005 | Marcacci |
| 2006/0180372 A1 | 8/2006 | Mercier et al. |
| 2006/0255550 A1 | 11/2006 | Pfeil et al. |
| 2007/0052711 A1 | 3/2007 | Gordon et al. |
| 2008/0023242 A1 | 1/2008 | Lachapelle et al. |
| 2008/0197597 A1 | 8/2008 | Moulene et al. |
| 2010/0032914 A1 | 2/2010 | Hara et al. |
| 2010/0194068 A1 | 8/2010 | Henderson |
| 2010/0324808 A1 | 12/2010 | Moulene et al. |
| 2011/0006498 A1 | 1/2011 | Mercier |
| 2012/0161410 A1 | 6/2012 | Ting et al. |
| 2012/0292875 A1 | 11/2012 | Koide et al. |
| 2013/0168934 A1 | 7/2013 | Krajekian |
| 2013/0168944 A1 | 7/2013 | Bartolozzi et al. |
| 2014/0238764 A1 | 8/2014 | Tsujii et al. |
| 2014/0353940 A1 | 12/2014 | Bartolozzi et al. |
| 2014/0375015 A1 | 12/2014 | Yu |
| 2015/0210338 A1 | 7/2015 | Iizuka et al. |
| 2016/0121954 A1 | 5/2016 | Sasaki et al. |
| 2016/0129967 A1 | 5/2016 | Sasaki et al. |

FOREIGN PATENT DOCUMENTS

| | | |
|---|---|---|
| CN | 201151444 Y | 11/2008 |
| CN | 202414056 U | 9/2012 |
| DE | 10 2010 052 715 B4 | 6/2011 |
| EP | 1 180 476 A1 | 2/2002 |
| EP | 2 368 729 A1 | 9/2011 |
| EP | 2 399 811 A1 | 12/2011 |
| EP | 2 995 543 A1 | 3/2016 |
| FR | 2 926 776 A1 | 7/2009 |
| GB | 1040389 A | 8/1966 |
| JP | 2001-10577 A | 1/2001 |
| JP | 2010-042710 A | 2/2010 |
| JP | 2010-228551 A | 10/2010 |
| JP | 2011-42223 A | 3/2011 |
| JP | 2011-195099 A | 10/2011 |
| JP | 2011-195100 A | 10/2011 |
| TW | 201118003 A1 | 6/2011 |
| TW | 201125770 A1 | 8/2011 |
| TW | 201210882 A | 3/2012 |
| WO | 99/61304 A1 | 12/1999 |
| WO | 03/101817 A1 | 12/2003 |
| WO | 2009/059099 A2 | 5/2009 |
| WO | 2010/013480 A1 | 2/2010 |
| WO | 2010/013482 A1 | 2/2010 |
| WO | 2012/007819 A1 | 1/2012 |
| WO | 2014/181736 A1 | 11/2014 |

OTHER PUBLICATIONS

Iizuka et al.; "Vehicle"; U.S. Appl. No. 14/430,371; filed Mar. 23, 2015.
Official Communication issued in corresponding European Patent Application No. 13839077.8, mailed on Nov. 6, 2015.
Official Communication issued in corresponding European Patent Application No. 13839077.8, mailed on Nov. 30, 2015.
Yosuke Hirayama; "Vehicle Provided with Leaning-Capable Vehicle-Body Frame and Two Front Wheel"; U.S. Appl. No. 14/901,391, filed Dec. 28, 2015.
Official Communication issued in International Patent Application No. PCT/JP2013/075619, mailed on Dec. 24, 2013.
Official Communication issued in corresponding Colombian Patent Application No. 15-91442-4, mailed on Jun. 24, 2016.

FIG. 13
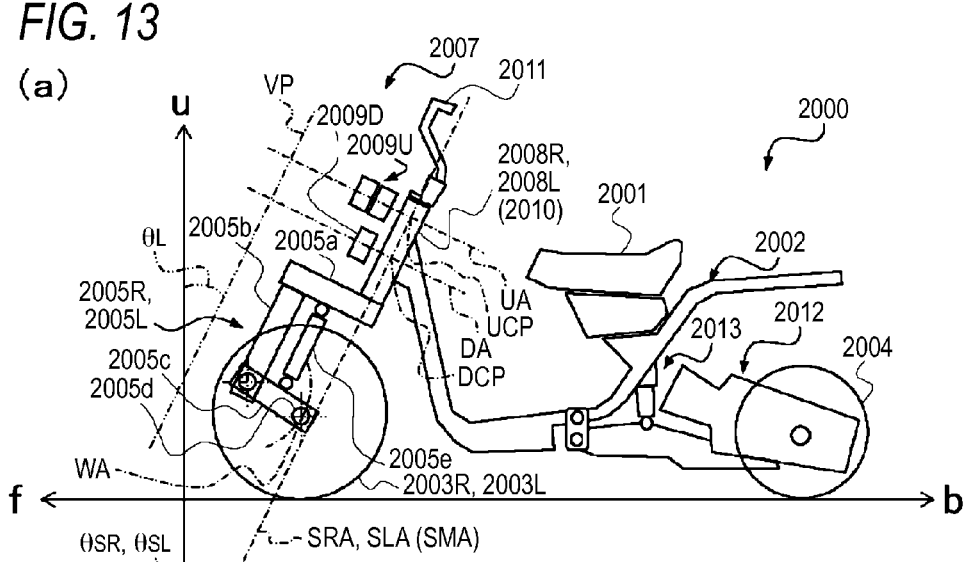
(a)
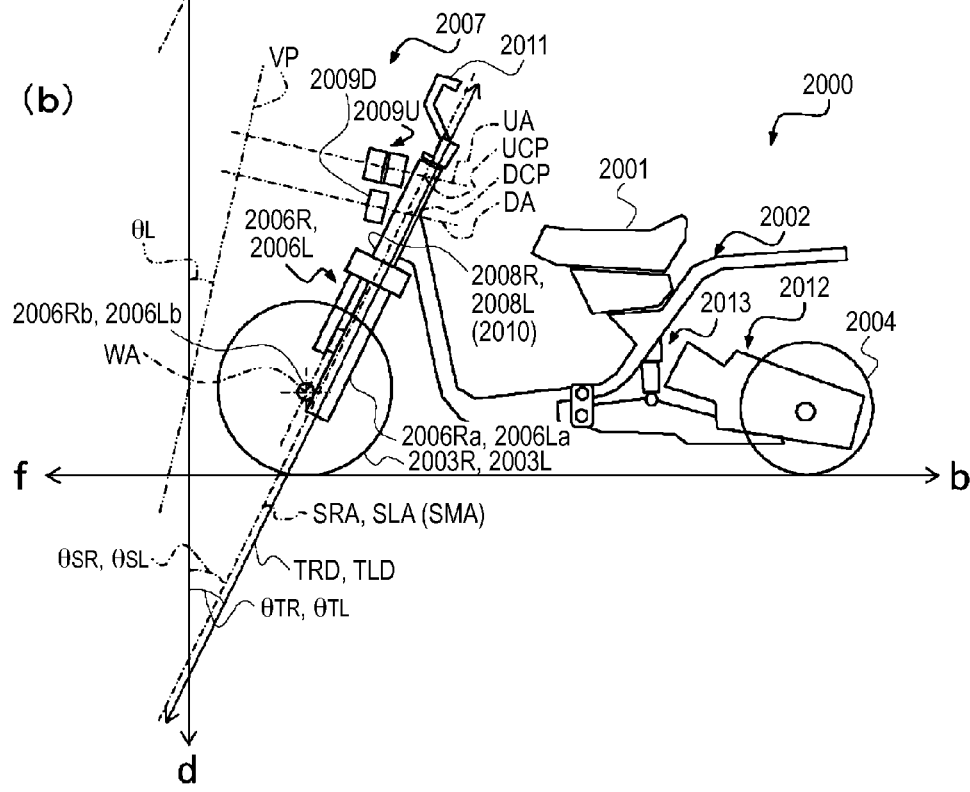
(b)

FIG. 16
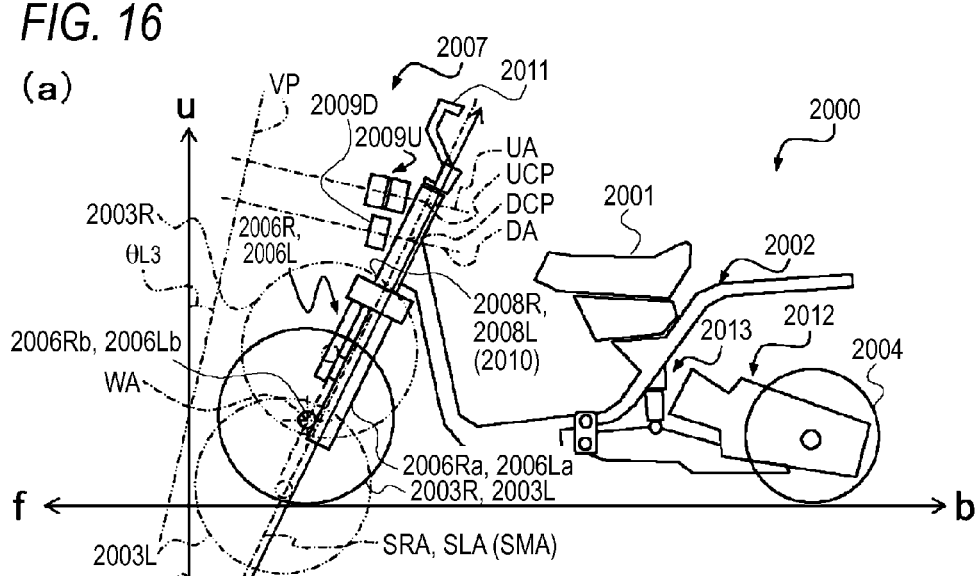
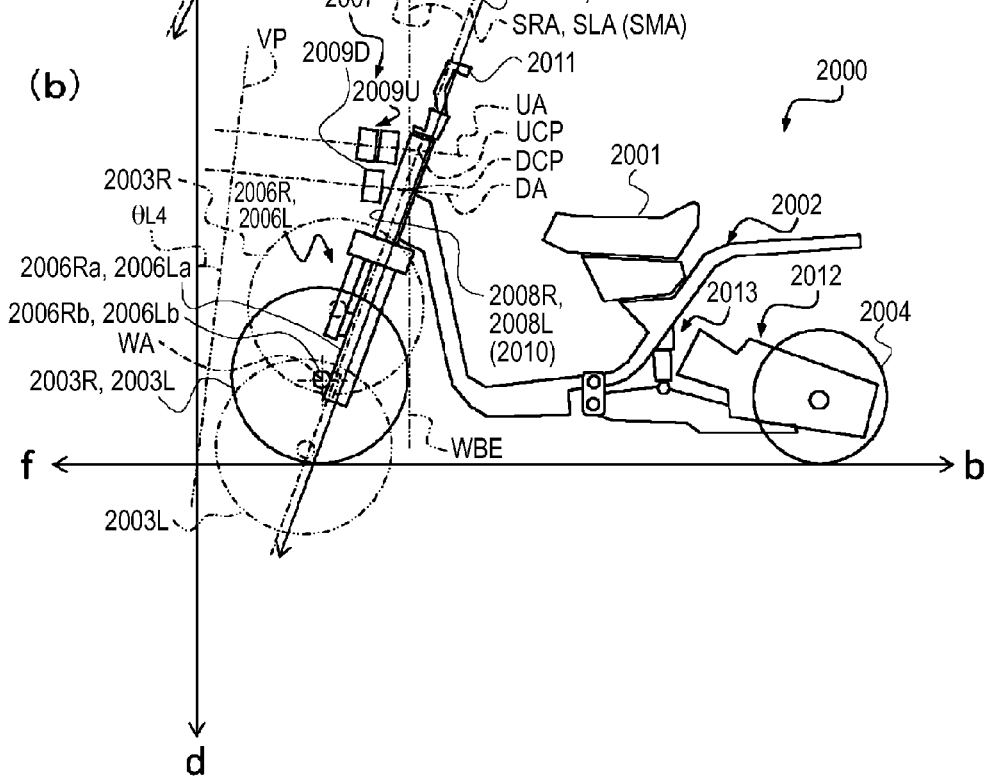

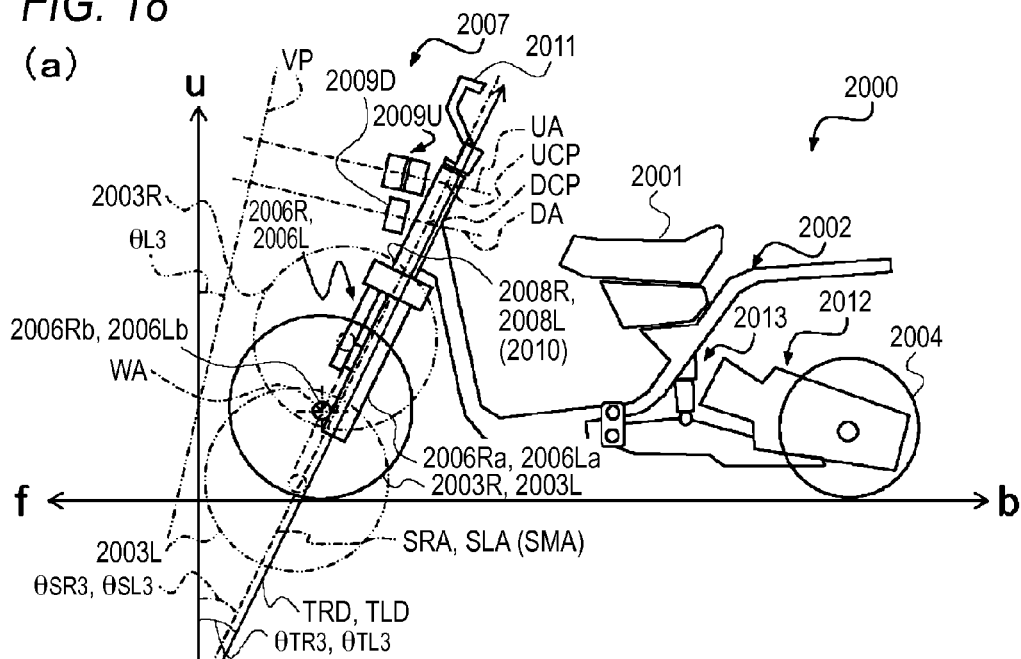
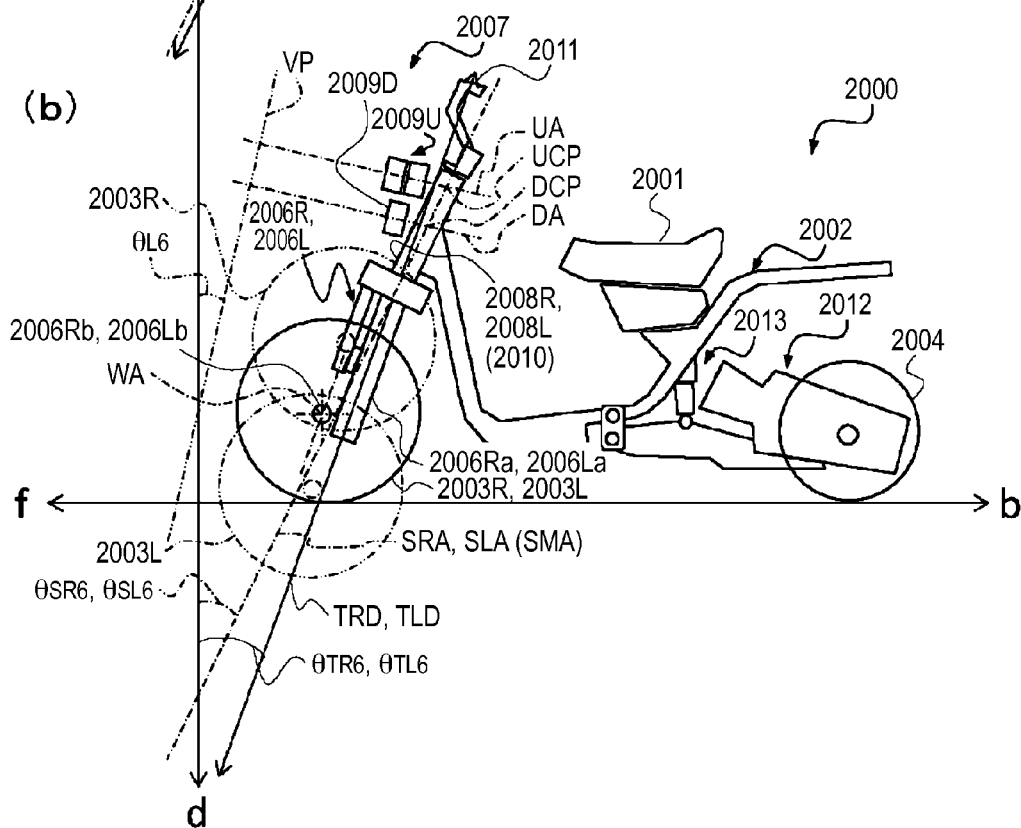
FIG. 18

VEHICLE

BACKGROUND OF THE INVENTION

1. Field of the Invention

The present invention relates to a vehicle including a leanable vehicle body frame and two front wheels.

2. Description of the Related Art

A known vehicle includes a vehicle body frame which leans in a left-and-right direction when the vehicle turns, and two front wheels arranged in the left-and-right direction of the vehicle body frame (for example, see Japanese Patent Unexamined Publication JP A-2011-195099).

The vehicle including the leanable vehicle body frame and two front wheels includes a link mechanism. The link mechanism includes an upper cross member and a lower cross member. In addition, the link mechanism includes a right side rod which supports right end portions of the upper cross member and the lower cross member, and a left side rod which supports left end portions of the upper cross member and the lower cross member. Intermediate portions of the upper cross member and the lower cross members are supported by the vehicle body frame directly in front of a steering shaft. In the vehicle disclosed in Japanese Patent Unexamined Publication JP A-2011-195099, the upper cross member and the lower cross member are supported by the vehicle body frame to be turnable around an axis orthogonal to a head pipe which is inclined so that a lower end thereof is positioned in front of an upper end (see Paragraphs [0023], [0024], and [0025] of Japanese Patent Unexamined Publication JP A-2011-195099). In accordance with the leaning of the vehicle body frame, the upper cross member and the lower cross member turn with respect to the vehicle body frame and relative positions of two front wheels in an up-and-down direction and a front-rear direction of the vehicle body frame change. In addition, the upper cross member and the lower cross member are provided above the two front wheels in the up-and-down direction of the vehicle body frame, in an upright state of the vehicle body frame.

The vehicle including the leanable vehicle body frame and the two front wheels includes a right shock absorbing device which movably supports the right front wheel in the up-and-down direction of the vehicle body frame, and a left shock absorbing device which movably supports the left front wheel in the up-and-down direction of the vehicle body frame. The right shock absorbing device is supported by the right side rod to be turnable around an axis of the right side rod. The left shock absorbing device is supported by the left side rod to be turnable around an axis of the left side rod. The vehicle disclosed in Japanese Patent Unexamined Publication JP A-2011-195099 further includes a handlebar, a steering shaft, and a turning transmission mechanism. The handlebar is fixed to the steering shaft. The steering shaft is supported to be turnable with respect to a head pipe of the vehicle body frame. When the handlebar is turned, the steering shaft also turns. The turning transmission mechanism transmits the turning of the steering shaft to the right shock absorbing device and the left shock absorbing device.

In the vehicle including the leanable vehicle body frame and the two front wheels, a riding space for a driver who operates the handlebar is provided behind the two front wheels.

In a vehicle including a leanable vehicle body frame and two front wheels, in accordance with the leaning of the vehicle body frame, an upper cross member and a lower cross member turn with respect to the vehicle body frame and relative positions of the two front wheels in an up-and-down direction and a front-rear direction of the vehicle body frame change. When the right front wheel moves downward and forward due to the turning of the upper cross member and the lower cross member, the left front wheel moves upward and rearward. When the right front wheel moves upward and rearward due to the turning of the upper cross member and the lower cross member, the left front wheel moves downward and forward. Accordingly, the movable ranges of the two front wheels in a front-rear direction of the vehicle body frame are large.

In addition, the vehicle including the leanable vehicle body frame and the two front wheels includes a riding space for a driver who operates a handlebar disposed behind the two front wheels. Accordingly, in an upright state of the vehicle body frame in which the two front wheels are not steered or leaned, a space for the front wheels to move in the front-rear direction is provided between the two front wheels and the riding space. Thus, the size of the entire vehicle including the leanable vehicle body frame and the two front wheels easily becomes large in the front-rear direction.

The vehicle disclosed in Japanese Patent Unexamined Publication JP A-2011-195099 includes a link-type right shock absorbing device and a link-type left shock absorbing device. In detail, the pair of right and left link-type shock absorbing devices include a bottom bridge which is provided below the side rods and extends forwards, a fork extending downward from a front end portion of the bottom bridge, a supporting arm of which one end portion is turnably supported with respect to the fork, an axle which is provided on the other end portion of the supporting arm and supports the front wheels, and a shock absorber which is provided between the bottom bridge and the supporting arm. In the link-type shock absorbing device, the front wheels also oscillate in accordance with the oscillation of the supporting arm. At that time, the shock absorber expands and contracts in accordance with the oscillation of the supporting arm. The oscillation of the front wheels is attenuated by the expansion and contraction of the shock absorber. Since the supporting arm is short and the shock absorber is supported by an intermediate portion of the supporting arm, a stroke of the shock absorber is short. In addition, since the supporting arm is short, a range of oscillation of the front wheels is narrow. Accordingly, the movable ranges of the right front wheel and the left front wheel in the front-rear direction of the vehicle body frame due to the operation of the link-type shock absorbing device are small. Since the link-type shock absorbing device is used in the vehicle disclosed in Japanese Patent Unexamined Publication JP A-2011-195099, the sizes of the movable ranges of the two front wheels in the front-rear direction of the vehicle body frame are prevented. Therefore, an increase in size of the entire vehicle in the front-rear direction is prevented.

However, in the link-type shock absorbing device, a stroke length of the right front wheel and the left front wheel due to the operation of the shock absorbing device is small. Accordingly, in the vehicle disclosed in Japanese Patent Unexamined Publication JP A-2011-195099, an increase in the size of the entire vehicle in the front-rear direction is prevented, but the stroke length of the right front wheel and the left front wheel due to the operation of the shock absorbing device is low, and thus riding comfort may be deteriorated.

SUMMARY OF THE INVENTION

Preferred embodiments of the present invention provide a vehicle including a leanable vehicle body frame and two front wheels that improves a riding comfort and prevents an increase in the size of the entire vehicle in a front-rear direction.

According to a preferred embodiment of the present invention, a vehicle includes a vehicle body frame; a right front wheel and a left front wheel disposed in a line in a left-and-right direction of the vehicle body frame; a right shock absorbing device supporting the right front wheel at a lower portion thereof and configured to attenuate displacement of the right front wheel with respect to the upper portion thereof in an up-and-down direction of the vehicle body frame; a left shock absorbing device supporting the left front wheel at a lower portion thereof and configured to attenuate displacement of the left front wheel with respect to the upper portion in the up-and-down direction of the vehicle body frame; a link mechanism including a right side rod including a lower portion positioned in front of an upper portion thereof in a front-rear direction of the vehicle body frame and supporting the upper portion of the right shock absorbing device to be turnable around a right axis extending in the up-and-down direction of the vehicle body frame; a left side rod including a lower portion positioned in front of an upper portion thereof in the front-rear direction of the vehicle body frame and supporting the upper portion of the left shock absorbing device to be turnable around a left axis parallel or substantially parallel with the right axis; an upper cross member including a right end portion turnably supporting the upper portion of the right side rod, a left end portion turnably supporting the upper portion of the left side rod, and an intermediate portion supported by the vehicle body frame to be turnable around an upper axis extending in the front-rear direction of the vehicle body frame; and a lower cross member including a right end portion turnably supporting the lower portion of the right side rod, a left end portion turnably supporting the lower portion of the left side rod, and an intermediate portion supported by the vehicle body frame to be turnable around a lower axis parallel or substantially parallel with the upper axis; and a steering shaft supported by the vehicle body frame between the right side rod and the left side rod in the left-and-right direction of the vehicle body frame, is turnable around an intermediate axis extending in the up-and-down direction of the vehicle body frame, including an upper end portion provided above the lower axis which is a turning axis of the lower cross member in the up-and-down direction of the vehicle body frame, and including a lower end portion provided in front of the upper end portion thereof in the front-rear direction of the vehicle body frame; wherein the right shock absorbing device includes a right telescopic element positioned directly in front of the vehicle body frame in the front-rear direction and configured to expand or contract in an expansion and contraction direction extending in the up-and-down direction of the vehicle body frame, and to cause the right front wheel to be displaced in the expansion and contraction direction of the right telescopic element, the left shock absorbing device includes a left telescopic element positioned directly in front of the vehicle body frame in the front-rear direction and configured to expand or contract in the expansion and contraction direction extending in the up-and-down direction of the vehicle body frame, and to cause the left front wheel to be displaced in the expansion and contraction direction of the left telescopic element, in an upright state of the vehicle body frame, an acute angle $\theta L$ defined by a virtual plane perpendicularly or substantially perpendicularly intersecting with the upper axis and the lower axis and the up-and-down direction of the vehicle body frame is smaller than an acute angle $\theta TR$ defined by the expansion and contraction direction of the right telescopic element and the up-and-down direction of the vehicle body frame, an acute angle $\theta TL$ defined by the expansion and contraction direction of the left telescopic element and the up-and-down direction of the vehicle body frame, an acute angle $\theta SR$ defined by the right axis of the right side rod and the up-and-down direction of the vehicle body frame, and an acute angle $\theta SL$ defined by the left axis of the left side rod and the up-and-down direction of the vehicle body frame; and in the upright state of the vehicle body frame, the acute angle $\theta TR$ and the acute angle $\theta TL$ are greater than the acute angle $\theta L$, and are equivalent to or smaller than the acute angle $\theta SR$ and the acute angle $\theta SL$.

According to the above configuration, since the right shock absorbing device includes the right telescopic element and supports the right front wheel to be movable in a direction of the expansion and contraction direction of the right telescopic element, it is easy to increase the stroke length of the right shock absorbing device. Since the left shock absorbing device includes the left telescopic element and supports the left front wheel to be movable in a direction of the expansion and contraction direction of the left telescopic element, it is easy to increase the stroke length of the left shock absorbing device. Accordingly, it is possible to secure a large stroke length due to the operation of the linkage-type shock absorbing device and to improve the riding comfort. However, when telescopic elements with large stroke lengths are included, the movable ranges of the right front wheel and the left front wheel also increase.

According to the above configuration, the right front wheel and the left front wheel are supported by the lower portions of the telescopic elements of the shock absorbing devices, and are displaced with respect to the upper portion of the telescopic elements in the expansion and contraction direction of the telescopic elements. The upper portions of the telescopic elements are supported by the link mechanism and are displaced with respect to the vehicle body frame in accordance with the leaning of the vehicle body frame. That is, the displacement due to the operation of the telescopic elements is added to the displacement of the right front wheel and the left front wheel due to the operation of the link mechanism. The inventors have discovered that the movable ranges of the right front wheel and the left front wheel of the entire vehicle are capable of being decreased by configuring the movable ranges thereof due to the operation of the shock absorbing devices and the movable ranges thereof due to the operation of the link mechanism. The inventors have discovered that, since the shock absorbing devices are supported by the link mechanism and support the front wheels, the right front wheel, the left front wheel, and the shock absorbing devices move when the link mechanism is operated, whereas the right front wheel and the left front wheel move but the link mechanism does not move when the shock absorbing devices are operated. Accordingly, the inventors have discovered that the movable range due to the operation of the link mechanism contributes more to the movable ranges of the right front wheel and the left front wheel of the entire vehicle, compared to the movable ranges of the right front wheel and the left front wheel in the front-rear direction due to the operation of the shock absorbing devices.

Thus, in the upright state of the vehicle body frame, the size of the acute angle $\theta L$ is preferably set to be smaller than the sizes of the acute angle $\theta TR$, the acute angle $\theta TL$, the acute angle defined by the right axis of the right side rod and the up-and-down direction of the vehicle body frame, and the acute angle defined by the left axis of the left side rod and the up-and-down direction of the vehicle body frame. Therefore, it is possible to decrease the movable range of the link mechanism in the front-rear direction of the vehicle body frame. In addition, it is possible to decrease the movable ranges of the right front wheel and the left front wheel in the front-rear direction of the vehicle body frame.

Then, it is conceivable that the acute angle θTR and the acute angle θTL may be set to be equivalent or substantially equivalent to the acute angle θL. However, in this case, the lower portions of the telescopic elements are positioned behind the upper portion thereof, and also the rear ends of the right front wheel and the left front wheel are positioned rearward. Accordingly, the movable ranges of the right front wheel and the left front wheel in the front-rear direction of the vehicle body frame may be increased.

According to the above configuration, the sizes of the acute angle θTR and the acute angle θTL preferably are set to be greater than the sizes of the acute angle θL, and to be equivalent to or smaller than the sizes of the acute angle θSR and the acute angle θSL. Thus, even when telescopic elements with large stroke lengths are used and the displacement of the telescopic elements is added to the displacement of the link mechanism, it is possible to prevent the increase of the movable ranges of the right front wheel and the left front wheel in the front-rear direction of the vehicle body frame. It is possible to increase the movable range due to the operation of the shock absorbing devices by using the movable range thereof due to the link mechanism, and to overlap the movable ranges of the front wheels due to the operation of the shock absorbing devices with the movable range of the link mechanism as much as possible. By considering the movable ranges of the right front wheel and the left front wheel due to the operation of the link mechanism and the movable range of the shock absorbing device including the telescopic element as an entire vehicle, it is possible to increase the stroke length of the right front wheel and the left front wheel in the up-and-down direction due to the operation of the shock absorbing devices, and to prevent the increase of the movable ranges of the right front wheel and the left front wheel in the front-rear direction of the entire vehicle. Since it is possible to prevent the increase of the movable ranges of the right front wheel and the left front wheel in the front-rear direction, it is possible to prevent the increase in size of the entire vehicle in the front-rear direction.

According to the above configuration, it is possible to provide a vehicle including a leanable vehicle body frame and two front wheels that improves a riding comfort and prevents the increase in size of the entire vehicle in the front-rear direction.

In addition, it is preferable that various preferred embodiments of the present invention include the following configurations.

A vehicle according to a preferred embodiment of the present invention described above, wherein, in a side view of the upright state of the vehicle body frame, an intersection of the right axis of the right side rod and the lower axis of the lower cross member is positioned in front of the rear end of the right front wheel in the front-rear direction of the vehicle body frame and an intersection of the left axis of the left side rod and the lower axis of the lower cross member is positioned in front of the rear end of the left front wheel in the front-rear direction of the vehicle body frame.

According to the above configuration, the sizes of the acute angle θSR and the acute angle θSL preferably are small. In addition, the sizes of the acute angle θTR and the acute angle θTL are also small. Accordingly, it is possible to secure the large stroke length of the right shock absorbing device and the left shock absorbing device, and to prevent the increase of the movable ranges of the right front wheel and the left front wheel in the front-rear direction. As a result, it is possible to improve the riding comfort and to prevent the increase in size of the entire vehicle in the front-rear direction.

In addition, it is preferable that various preferred embodiments of the present invention include the following configurations.

A vehicle according to a preferred embodiment of the present invention described above, wherein, in a side view of the upright state of the vehicle body frame, an intersection of the right axis of the right side rod and the upper axis of the upper cross member is positioned in front of the rear end of the right front wheel in the front-rear direction of the vehicle body frame and an intersection of the left axis of the left side rod and the upper axis of the upper cross member is positioned in front of the rear end of the left front wheel in the front-rear direction of the vehicle body frame.

According to the above configuration, the sizes of the acute angle θSR defined by the right axis of the right side rod and the up-and-down direction of the vehicle body frame, and the acute angle θSL defined by the left axis of the left side rod and the up-and-down direction of the vehicle body frame are even smaller. In addition, the sizes of the acute angle θTR defined by the expansion and contraction direction of the right telescopic element and the up-and-down direction of the vehicle body frame and the acute angle θTL defined by the expansion and contraction direction of the left telescopic element and the up-and-down direction of the vehicle body frame are also even smaller. Accordingly, it is possible to secure the large stroke length of the right shock absorbing device and the left shock absorbing device, and to prevent the increase of the movable ranges of the right front wheel and the left front wheel in the front-rear direction. As a result, it is possible to improve the riding comfort and to prevent the increase in size of the entire vehicle in the front-rear direction.

In addition, it is preferable that various preferred embodiments of the present invention include the following configurations.

A vehicle according to a preferred embodiment of the present invention described above, wherein, in the upright state of the vehicle body frame, the acute angle θTR defined by an expansion and contraction direction of the right telescopic element and the up-and-down direction of the vehicle body frame, the acute angle θTL defined by an expansion and contraction direction of the left telescopic element and the up-and-down direction of the vehicle body frame, the acute angle θSR defined by the right axis of the right side rod and the up-and-down direction of the vehicle body frame, and the acute angle θSL defined by the left axis of the left side rod and the up-and-down direction of the vehicle body frame are equivalent or substantially equivalent to each other, the rotation axes of the right front wheel and the left front wheel are positioned in front of the right axis of the right side rod and the left axis of the left side rod, and the expansion and contraction direction of the right telescopic element and the expansion and contraction direction of the left telescopic element are positioned behind the right axis of the right side rod and the left axis of the left side rod in the front-rear direction of the vehicle body frame.

According to the above configuration, the rotation axes of the right front wheel and the left front wheel are disposed in front of the right axis of the right side rod and the left axis of the left side rod, and the expansion and contraction direction of the right telescopic element and the expansion and contraction direction of the left telescopic element are disposed behind the right axis of the right side rod and the left axis of the left side rod. Accordingly, it is possible to increase the stroke length of the right telescopic element and the left telescopic element, without shifting the right front wheel and the left front wheel rearward. As a result, it is possible to improve the riding comfort and to prevent the increase in size of the entire vehicle in the front-rear direction.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 13(a) and 13(b) are explanatory diagrams of a side view schematically showing a third preferred embodiment of the present invention and a comparative example of the present invention in an upright state of the vehicle body frame.

FIGS. 16(a) and 16(b) are explanatory diagrams of a side view schematically showing the third preferred embodiment and a fourth preferred embodiment of the present invention in an upright state of the vehicle body frame.

FIGS. 18(a) and 18(b) are explanatory diagrams of a side view schematically showing the third preferred embodiment and a sixth preferred embodiment of the present invention in an upright state of the vehicle body frame.

DETAILED DESCRIPTION OF THE PREFERRED EMBODIMENTS

Figure 1:
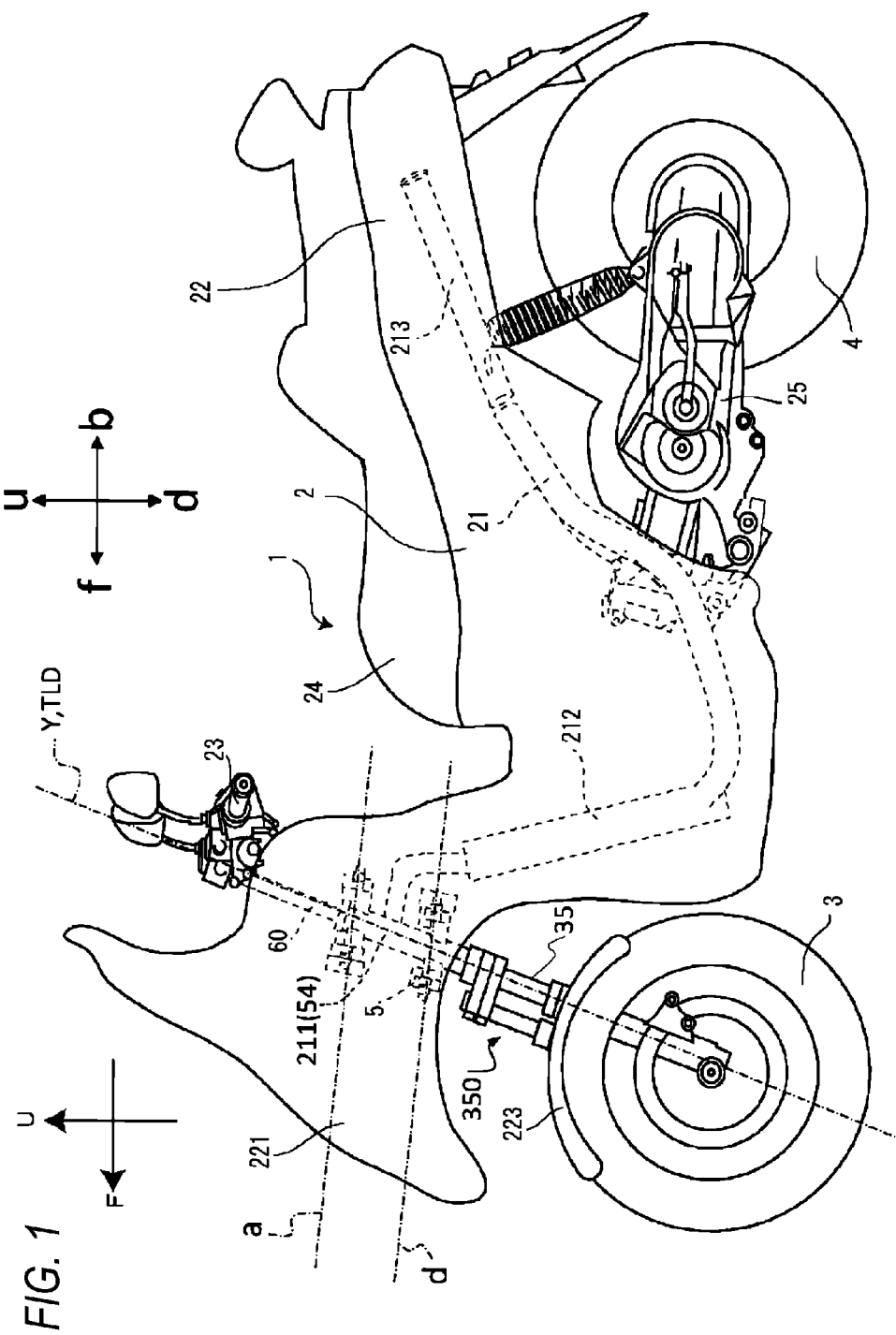
FIG. 1 is a side view of a vehicle according to a preferred embodiment of the present invention.

Hereinafter, the present invention will be described based on preferred embodiments with reference to the drawings.
First Preferred Embodiment Hereinafter, a vehicle 1 according to a preferred embodiment of the present invention will be described with reference to FIG. 1 to FIG. 5. In FIG. 1 to FIG. 5, the same reference numbers will be given to the same or corresponding parts in the drawings, and the description of members thereof will be not repeated. Hereinafter, in FIG. 1 to FIG. 5, an arrow F in the drawings indicates a forward direction of the vehicle 1. An arrow R in the drawings indicates a right direction of the vehicle 1. An arrow L in the drawings indicates a left direction of the vehicle 1. An arrow U indicates upwards. Outside in a vehicle width direction indicates outward with respect to the center in the vehicle width direction. That is, the outside in a vehicle width direction indicates to the left or to the right of the center in the vehicle width direction. Hereinafter, an arrow u indicates upwards of a vehicle body frame 21 and an arrow d indicates downwards of the vehicle body frame 21. An arrow f indicates a forward direction of the vehicle body frame 21 and an arrow b indicates a rear direction of the vehicle body frame 21. In FIG. 1 to FIG. 5, in a case of setting an axis extending in a front-rear direction, the axis is not necessarily parallel with the front-rear direction. The axis extending in a front-rear direction preferably is an axis which is inclined in a range of about ±45°, for example, with respect to the front-rear direction. In the same manner as described above, an axis extending in an up-and-down direction preferably is an axis which is inclined in a range of about ±45°, for example, with respect to the up-and-down direction. An axis extending in a left-and-right direction preferably is an axis which is inclined in a range of about ±45°, for example, with respect to the left-and-right direction. In addition, when indicating the directions as front, rear, right, and left in the following descriptions, it indicates directions of front, rear, right, and left when seen from a rider on the vehicle 1.

FIG. 1 is a side view of the entire vehicle 1.

The vehicle 1 includes a leanable vehicle body frame 21 and two front wheels 31 and 32. The vehicle 1 includes a vehicle main body 2, front wheels 3 (31, 32) and a rear wheel 4. The vehicle main body 2 mainly includes the vehicle body frame 21, a vehicle body cover 22, a handlebar 23, a seat 24, and a power unit 25.

The vehicle body frame 21 supports the power unit 25, the seat 24, and the like. The power unit 25 includes an engine, a transmission, and the like. In FIG. 1, the vehicle body frame 21 is shown with a dashed line.

The vehicle body frame 21 includes a head pipe 211, a down frame 212, and a rear frame 213. The head pipe 211 is disposed in a front portion of the vehicle 1. The link mechanism 5 is disposed around the head pipe 211. The link mechanism 5 includes a left side rod 54 extending in a direction of a left axis Y, an upper cross member 51 which is able to turn around an upper axis a, and a lower cross member 52 which is able to turn around a lower axis d. The upper axis a and the lower axis d are parallel or substantially parallel with each other. The upper axis a and the lower axis d extend in the front-rear direction of the vehicle body frame. The upper axis a and the lower axis d extend forward and above the vehicle body frame. In the vehicle 1, the head pipe 211 and the left side rod 54 are disposed parallel or substantially parallel with each other and overlap in a side view. A steering shaft 60 is supported by the vehicle body frame. The steering shaft 60 is able to turn around an intermediate axis extending in the up-and-down direction of the vehicle body frame 21. The steering shaft 60 is turnably supported by the head pipe 211. The steering shaft 60 extends in the up-and-down direction. A lower end portion of the steering shaft 60 is positioned in front of an upper end portion thereof in the front-rear direction of the vehicle body frame 21. The handlebar 23 is attached to the upper end of the steering shaft 60. A left shock absorbing device 350 is disposed directly below the link mechanism 5. The left shock absorbing device 350 is turnable around a left turning axis Y of the left side rod 54. The left shock absorbing device 350 includes a left telescopic element 35. The left telescopic element 35 expands or contracts in an expansion and contraction direction TLD. In the vehicle 1, the left axis Y of the left side rod 54 and the expansion and contraction direction TLD of the left telescopic element 35 coincide with each other.

The vehicle body frame 21 is covered with the vehicle body cover 22. The vehicle body cover 22 includes a front cover 221 and front fenders 223.

The front cover 221 is positioned directly in front of the seat 24. The front cover 221 covers the head pipe 211 and the link mechanism 5.

The front fenders 223 are provided directly above the pair of right and left front wheels 3, respectively. The front fenders 223 are disposed directly below the front cover 221.

The front wheels 3 are disposed below the head pipe 211 and the link mechanism 5. The front wheels 3 are disposed directly below the front cover 221. The rear wheel 4 is disposed directly below the vehicle body cover 22.

Figure 2:
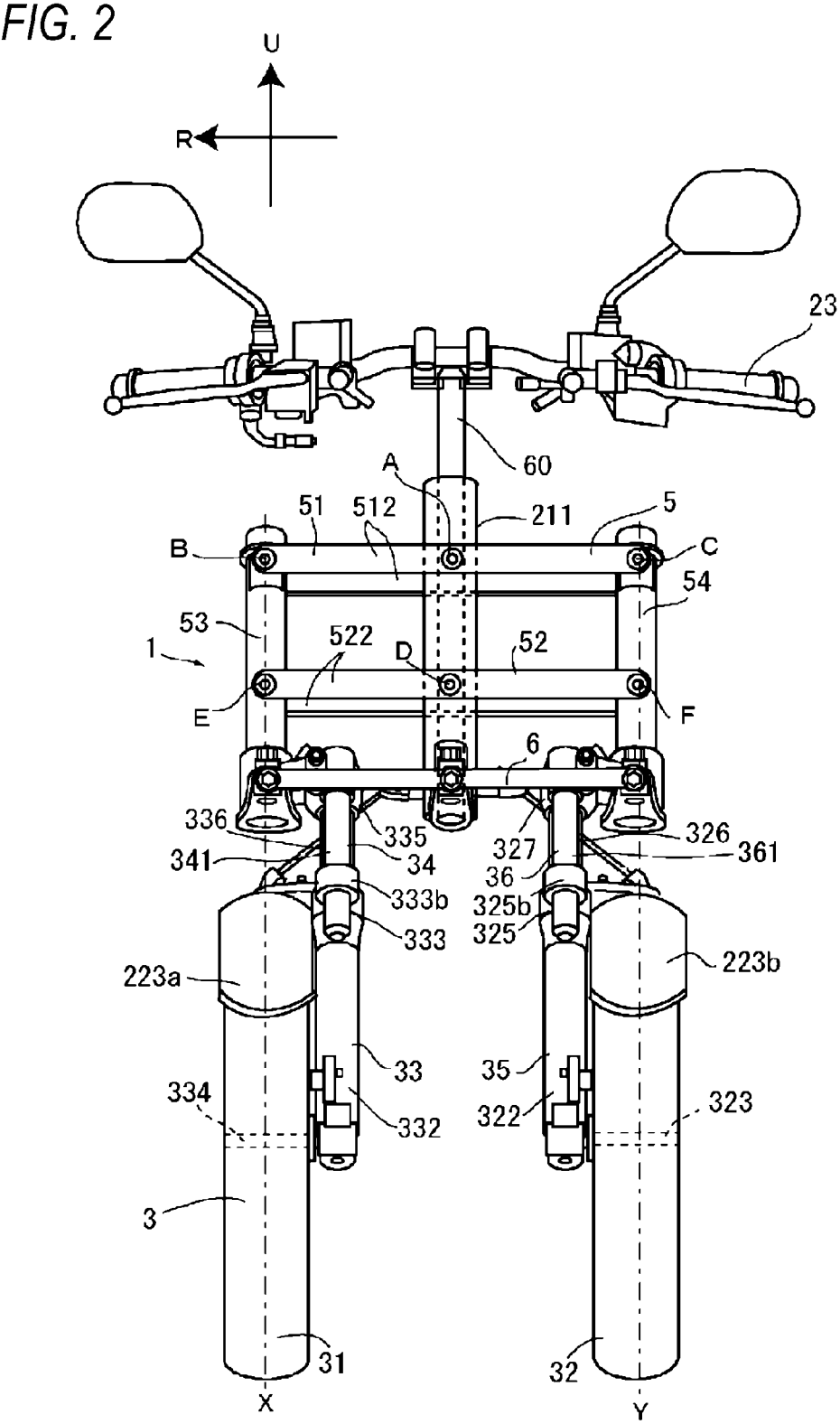
FIG. 2 is a front view of the vehicle in a state where a vehicle body cover of the vehicle of FIG. 1 is removed.

FIG. 2 is a front view of the entire vehicle 1 in a state where the vehicle body cover 22 is removed. In FIG. 2, the down frame 212 and the like are not shown.

The vehicle 1 includes the handlebar 23, the steering shaft 60, the head pipe 211, the pair of right and left front wheels 3, a right telescopic element 33, a right turning prevention mechanism 34, the left telescopic element 35, a left turning prevention mechanism 36, the link mechanism 5, and a turning transmission mechanism 6.

The front wheels 3 include the right front wheel 31 and the left front wheels 32. The right front wheel 31 and the left front wheels 32 are disposed in a line in the left-and-right direction of the vehicle body frame 21. The right front wheel 31 is disposed to the right of the center in the vehicle width direction. A right front fender 223a is disposed above the right front wheel 31. The left front wheel 32 is disposed to the left of the center in the vehicle width direction. A left front fender 223b is disposed above the left front wheel 32. In the upright state of the vehicle body frame, the left front wheel 32 is symmetrical to the right front wheel 31, with respect to the center in the vehicle width direction.

The right front wheel 31 is supported by a right shock absorbing device 330. The right shock absorbing device 330 includes the right telescopic element 33. The right shock absorbing device 330 includes the right telescopic element 33 and the right turning prevention mechanism 34. A lower portion 332 of the right telescopic element 33 supports a rotation shaft 334 of the right front wheel at the lower end thereof. The rotation shaft 334 of the right front wheel supports the right front wheel 31. The right shock absorbing device 330 causes the right front wheel 31 to be displaced in an expansion and contraction direction of the right telescopic element 33. The lower portion 332 of the right telescopic element extends in the up-and-down direction. A right guide 333 is disposed on the upper end of the lower portion 332 of the right telescopic element. The right guide 333 is fixed to the upper portion of the lower portion 332 of the right telescopic element. The right front wheel 31 is able to turn around a right axis X of the right side rod 53. The right front wheel 31 is able to turn around the right axis X and change the direction.

The right telescopic element 33 includes the lower portion 332 of the right telescopic element and an upper portion 336 of the right telescopic element. A portion of the upper portion 336 of the right telescopic element is inserted into the lower portion 332 of the right telescopic element. The upper portion 336 of the right telescopic element is disposed above the lower portion 332 of the right telescopic element. The upper portion 336 of the right telescopic element moves relatively with respect to the lower portion 332 of the right telescopic element, in the direction in which the lower portion 332 of the right telescopic element extends. The upper end of the upper portion 336 of the right telescopic element is fixed to a right bracket 335. The right telescopic element 33 supports the right front wheel 31 by the lower portion 332, and expands, contracts, and attenuates the displacement of the right front wheel 31 with respect to the upper portion 336 in the up-and-down direction of the vehicle body frame 21.

The right turning prevention mechanism 34 prevents the turning of the lower portion 332 of the right telescopic element with respect to the upper portion 336 of the right telescopic element. The right turning prevention mechanism 34 includes the right guide 333, a right turning prevention rod 341, and the right bracket 335. The right guide 333 guides a moving direction of the right turning prevention rod 341. The right guide 333 includes a right guide tube 333b. The right turning prevention rod 341 is inserted into the right guide tube 333b. The right turning prevention rod 341 moves relatively with respect to the right guide tube 333b. The right turning prevention rod 341 prevents the relative turning of the right front wheel 31 with respect to the upper portion 336 of the right telescopic element. The right turning prevention rod 341 is parallel or substantially parallel with the right telescopic element 33. The upper end of the right turning prevention rod 341 is fixed to the right bracket 335. The right turning prevention rod 341 cannot move relatively with respect to the upper portion 336 of the right telescopic element. The right bracket 335 fixes the upper portion 336 of the right telescopic element and the right turning prevention rod 341 to each other.

The left front wheel 32 is supported by the left shock absorbing device 350. The left shock absorbing device 350 includes a left telescopic element 35. The left shock absorbing device 350 includes the left telescopic element 35 and the left turning prevention mechanism 36. A lower portion 322 of the left telescopic element 35 supports a rotation shaft 323 of the left front wheel at the lower end thereof. The rotation shaft 323 of the left front wheel supports the left front wheel 32. The left shock absorbing device 350 causes the left front wheel 32 to be displaced in an expansion and contraction direction of the left telescopic element 35. The lower portion 322 of the left telescopic element extends in the up-and-down direction. A left guide 325 is disposed on the upper end of the lower portion 322 of the left telescopic element. The left guide 325 is fixed to the upper portion of the lower portion 322 of the left telescopic element. The left front wheel 32 is able turn around the left axis Y of the left side rod 54. The left front wheel 32 is able to turn around the left axis Y and change the direction.

The left telescopic element 35 includes the lower portion 322 of the left telescopic element and an upper portion 326 of the left telescopic element. A portion of the upper portion 326 of the left telescopic element is inserted into the lower portion 322 of the left telescopic element. The upper portion 326 of the left telescopic element is disposed above the lower portion 322 of the left telescopic element. The upper portion 326 of the left telescopic element moves relatively with respect to the lower portion 322 of the left telescopic element, in the direction in which the lower portion 322 of the left telescopic element extends. The upper end of the upper portion 326 of the left telescopic element is fixed to a left bracket 327. The left telescopic element 35 supports the left front wheel 32 at the lower portion 322, and expands, contracts, and attenuates the displacement of the left front wheel 32 with respect to the upper portion 326 in the up-and-down direction of the vehicle body frame 21.

The left turning prevention mechanism 36 prevents the turning of the lower portion 322 of the left telescopic element with respect to the upper portion 326 of the left telescopic element. The left turning prevention mechanism 36 includes the left guide 325, a left turning prevention rod 361, and the left bracket 327. The left guide 325 guides a moving direction of the left turning prevention rod 361. The left guide 325 includes a left guide tube 325b. The left turning prevention rod 361 is inserted into the left guide tube 325b. The left turning prevention rod 361 moves relatively with respect to the left guide tube 325b. The left turning prevention rod 361 prevents the relative turning of the left front wheel 32 with respect to the upper portion 326 of the left telescopic element. The left turning prevention rod 361 is parallel or substantially parallel with the left telescopic element 35. The upper end of the left turning prevention rod 361 is fixed to the left bracket 327. The left turning prevention rod 361 cannot move relatively with respect to the upper portion 326 of the left telescopic element. The left bracket 327 fixes the upper portion 326 of the left telescopic element and the left turning prevention rod 361.

The link mechanism 5 is disposed below the handlebar 23 in a front view. The link mechanism 5 is disposed above the right front wheel 31 and the left front wheel 32. The link mechanism 5 is connected to the head pipe 211. The link mechanism 5 includes the upper cross member 51, the lower cross member 52, the right side rod 53, and the left side rod 54.

The upper cross member 51 is supported by the vehicle body frame 21 (head pipe 211) with an upper shaft A. The upper cross member 51 is supported by the vehicle body frame 21 so as to turn around the upper axis a. The upper cross member 51 is supported by the head pipe 211 so as to turn in a plane including the upper cross member 51 and the lower cross member 52. The upper cross member 51 is able to turn relatively with respect to the steering shaft 60 in the left-and-right direction. Even when the steering shaft 60 turns in accordance with the turning of the handlebar 23, the upper cross member 51 does not turn with respect to the head pipe 211. The upper cross member 51 extends in the vehicle width direction. A right end portion of the upper cross member 51 is connected to the upper portion of the right side rod 53 with a connection portion B. The upper cross member 51 is supported by the upper portion of the right side rod 53 so as to turn around a turning axis of the connection portion B. A left end portion of the upper cross member 51 is connected to the upper portion of the left side rod 54 with a connection portion C. The upper cross member 51 is supported by the upper portion of the left side rod 54 so as to turn relatively around a turning axis of the connection portion C. The upper cross member 51 is able to turn with respect to the right side rod 53 and the left side rod 54 in a plane including the upper cross member 51 and the lower cross member 52. The upper axis a which is the turning axis of the upper shaft A supporting the intermediate portion of the upper cross member 51, the turning axis of the connection portion B supporting the right end portion thereof, and the turning axis of the connection portion C supporting the left end portion are parallel or substantially parallel with each other. The upper cross member 51 includes a pair of upper cross members 512. The head pipe 211 is interposed between the pair of upper cross members 512 in the front-rear direction.

The lower cross member 52 is supported by the vehicle body frame 21 (head pipe 211) with a lower shaft D. The lower cross member 52 is supported by the vehicle body frame 21 so as to turn around the lower axis d. The lower cross member 52 is supported by the head pipe 211 so as to turn in a plane including the upper cross member 51 and the lower cross member 52. The lower cross member 52 is disposed directly below the upper cross member 51 in a front view. The lower cross member 52 is parallel or substantially parallel with the upper cross member 51. The lower cross member 52 preferably has the same length as that of the upper cross member 51. The lower cross member 52 is able to turn relatively with respect to the steering shaft 60 in the left-and-right direction. Even when the steering shaft 60 turns in accordance with the handlebar 23, the lower cross member 52 does not turn with respect to the head pipe 211. The lower cross member 52 extends in the vehicle width direction. A right end portion of the lower cross member 52 is connected to the lower portion of the right side rod 53 with a connection portion E. The lower cross member 52 is supported by the lower portion of the right side rod 53 so as to turn around a turning axis of the connection portion E. A left end portion of the lower cross member 52 is connected to the lower portion of the left side rod 54 with a connection portion F. The lower cross member 52 is supported by the lower portion of the left side rod 54 so as to turn relatively around a turning axis of the connection portion F. The lower cross member 52 is able to turn with respect to the right side rod 53 and the left side rod 54 in a plane including the upper cross member 51 and the lower cross member 52. The lower axis d which is the turning axis of the lower shaft D supporting the intermediate portion of the lower cross member 52, the turning axis of the connection portion E supporting the right end portion thereof, and the turning axis of the connection portion F supporting the left end portion are parallel or substantially parallel with each other. The lower cross member 52 includes a pair of lower cross members 522. The head pipe 211 is interposed between the pair of lower cross members 522 in the front-rear direction. In the present preferred embodiment, the upper cross member 51 and the lower cross member 52 are preferably a pair of front and rear plate-like members which extend in the left-and-right direction, but the upper cross member 51 and the lower cross member 52 may be a member extending rightward from the head pipe 211 and a member extending leftward from the head pipe 211, respectively.

The right side rod 53 is disposed directly to the right of the head pipe 211. The right side rod 53 extends in the direction in which the head pipe 211 extends. The right side rod 53 extends in the direction in which the steering shaft 60 extends. The right side rod 53 is disposed above the right front wheel 31. The right side rod 53 supports the right shock absorbing device 330 so as to turn around the right axis X. The right side rod 53 is disposed above the right bracket 335.

The right side rod 53 supports the right bracket 335 so as to turn around the right axis X. The right bracket 335 turns around the right axis X by turning the handlebar 23. The right side rod 53 does not turn with respect to the vehicle body frame 21 when the right bracket 335 turns. The right side rod 53 is disposed to the right of the right telescopic element 33. The right side rod 53 is disposed directly above the right telescopic element 33.

The left side rod 54 is disposed directly to the left of the head pipe 211. The left side rod 54 extends in the direction in which the head pipe 211 extends. The left side rod 54 extends in the direction in which the steering shaft 60 extends. The left side rod 54 is disposed directly above the left front wheel 32. The left side rod 54 is disposed directly above the left bracket 327. The left side rod 54 is attached so as to turn the left bracket 327 around the left axis Y. The left bracket 327 turns around the left axis Y by turning the handlebar 23. The left side rod 54 does not turn with respect to the vehicle body frame 21 when the left bracket 327 turns. The left side rod 54 is disposed to the left of the left telescopic element 35. The left side rod 54 is disposed above the left telescopic element 35.

The turning transmission mechanism 6 transmits an operation force of the handlebar 23 by a rider to the right front wheel 31 and the left front wheel 32. A portion of the turning transmission mechanism 6 is disposed below the lower cross member 52. The turning transmission mechanism 6 is disposed above the right front wheel 31 and the left front wheel 32.

Figure 3:
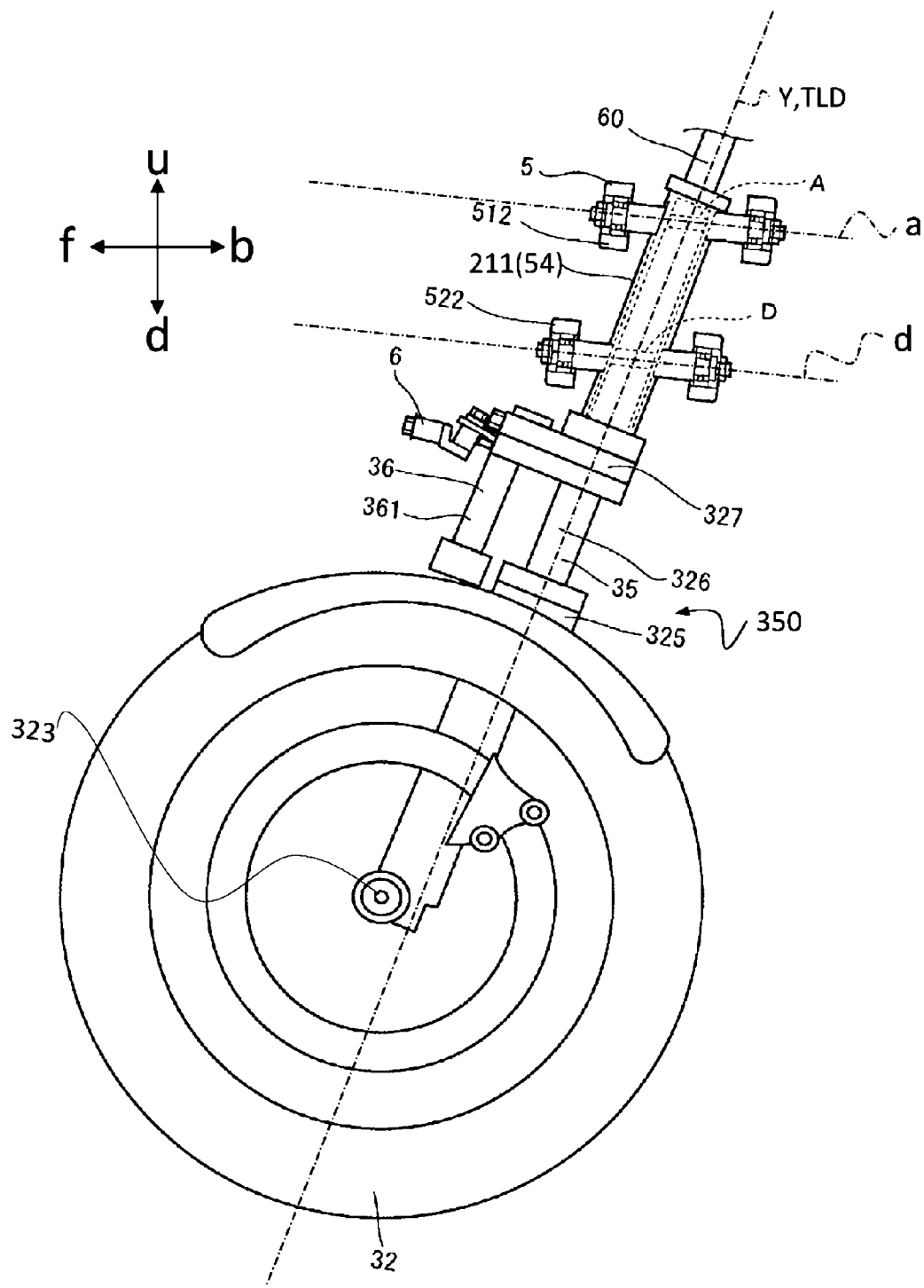
FIG. 3 is a partial side view of the vehicle of FIG. 1.

FIG. 3 is an enlarged view of the front portion of the vehicle based on the upper axis a, the lower axis d, the left axis Y, the expansion and contraction direction TLD of the left telescopic element 35 of FIG. 1, and is a left side view of the vicinity of the link mechanism 5 and the left front wheel 32 in the upright state of the vehicle body frame, in the front-rear direction of the vehicle body frame 21. In FIG. 3, the down frame 212, the handlebar 23, and the like which are positioned directly behind the link mechanism 5 are not shown. The upper portion of the head pipe 211 is interposed between the pair of upper cross members 512 in the front-rear direction of the vehicle body frame 21. The lower portion of the head pipe 211 is interposed between the pair of lower cross members 522 in the front-rear direction of the vehicle body frame 21. In a side view, the head pipe 211 extends so that the lower portion is positioned in front of the upper portion thereof in the front-rear direction of the vehicle body frame 21. The head pipe 211 is parallel or substantially parallel with the left side rod 54. The left axis Y of the left side rod extends in the up-and-down direction of the vehicle body frame 21. The upper end of the left axis Y of the left side rod is positioned behind the lower end thereof in the front-rear direction of the vehicle body frame 21. In a side view, the upper shaft A extends so as to intersect with the steering shaft 60. The upper axis a extends so as to intersect with the steering shaft 60. The upper axis a extends in the front-rear direction of the vehicle body frame 21. In a side view, lower shaft D extends so as to intersect with the steering shaft 60. The lower axis d extends so as to intersect with the steering shaft 60. The lower axis d extends in the front-rear direction of the vehicle body frame 21. The left shock absorbing device 350 supports the left front wheel 32. The expansion and contraction direction TLD of the left telescopic element 35 of the left shock absorbing device 350 extends in the up-and-down direction of the vehicle body frame 21. The upper portion of the expansion and contraction direction TLD of the left telescopic element 35 of the left shock absorbing device 350 is positioned behind the lower portion thereof in the front-rear direction of the vehicle body frame 21. In a side view, the upper end of the left telescopic element 35 is disposed below the lower end of the link mechanism 5. Although not shown in FIG. 3, in a side view, the upper end of the right telescopic element 33 is disposed below the lower end of the link mechanism 5.

Figure 4:
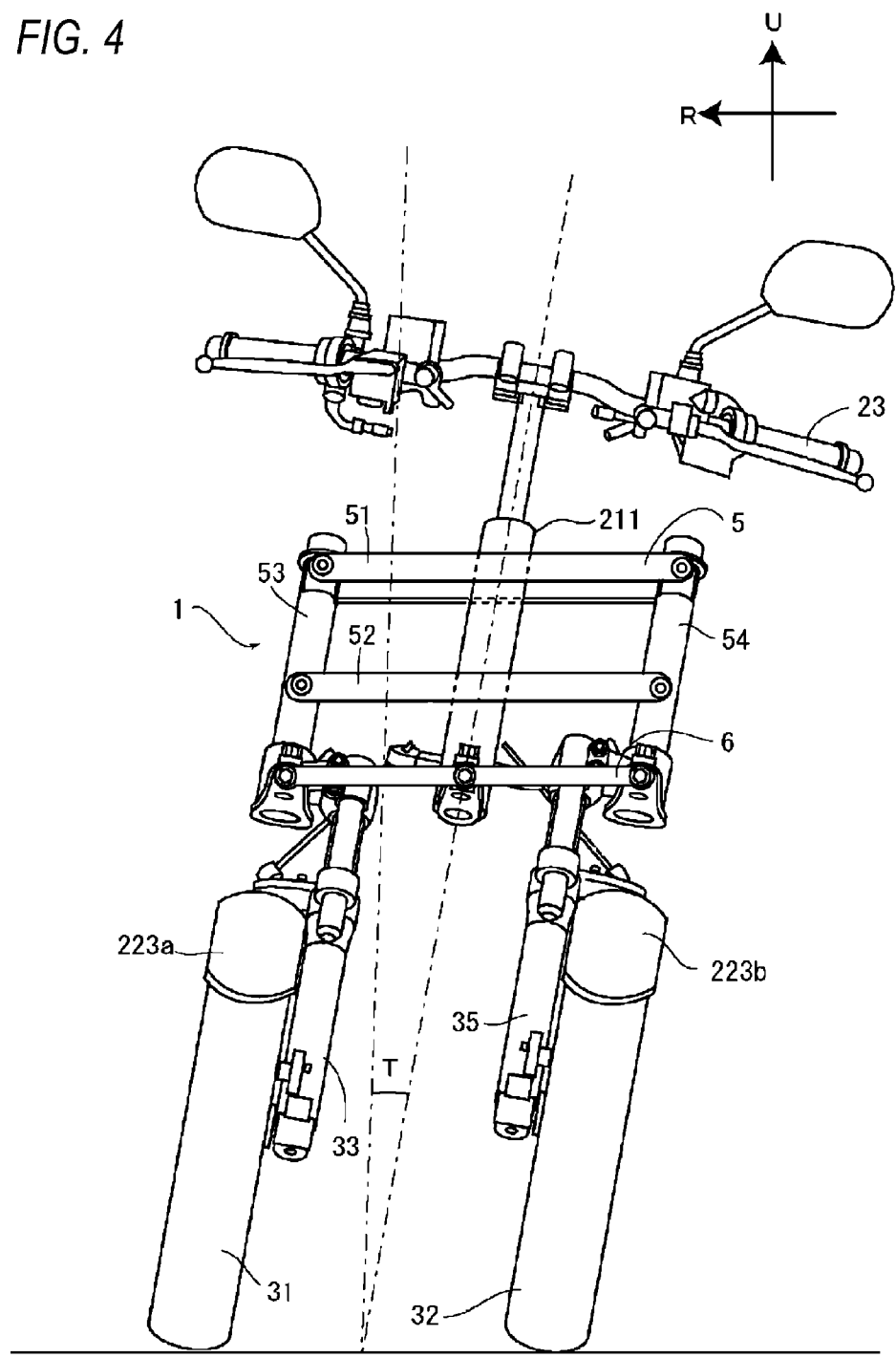
FIG. 4 is a front view showing the vehicle of FIG. 1 in a state where the vehicle is leaning.

FIG. 4 is a front view showing the entire vehicle 1 in a state where the vehicle is leaned leftward by an angle T. When the vehicle body of the vehicle 1 leans in the left-and-right direction, the link mechanism 5 transforms. When a rider leans the vehicle body of the vehicle 1 leftward by the angle T, the head pipe 211 leans leftward with respect to the vertical direction. When the head pipe 211 leans, the upper cross member 51 and the lower cross member 52 turn with respect to the head pipe 211. The left end portion of the upper cross member 51 moves more leftward of the left end portion of the lower cross member 52, in accordance with the leftward leaning of the head pipe 211. The upper cross member 51 moves leftward of the lower cross member 52, and accordingly the left side rod 54 leans. At that time, the left side rod 54 is parallel or substantially parallel with the head pipe 211. In the same manner as in the left side rod 54, the right side rod 53 leans with respect to the vertical direction. The right side rod 53 is parallel or substantially parallel with respect to the head pipe 211. When the right side rod 53 and the left side rod 54 lean, the right side rod 53 turns with respect to the upper cross member 51 and the lower cross member 52. When the right side rod 53 and the left side rod 54 lean, the left side rod 54 turns with respect to the upper cross member 51 and the lower cross member 52. In addition, the right shock absorbing device 330 is supported by the link mechanism 5 and supports the right front wheel 31. The left shock absorbing device 350 is supported by the link mechanism 5 and supports the left front wheel 32. Thus, the right front wheel 31, the left front wheel 32, the right shock absorbing device 330, and the left shock absorbing device 350 move when the link mechanism 5 is operated, whereas the right front wheel 31 and the left front wheel 32 move but the link mechanism 5 does not move when the right shock absorbing device 330 and the left shock absorbing device 350 are operated. By doing so, when the vehicle 1 leans, the right front wheel 31 and the left front wheel 32 lean with respect to the vertical direction, respectively. The right front wheel 31 and the left front wheel 32 are parallel or substantially parallel with the head pipe 211.

Figure 5:
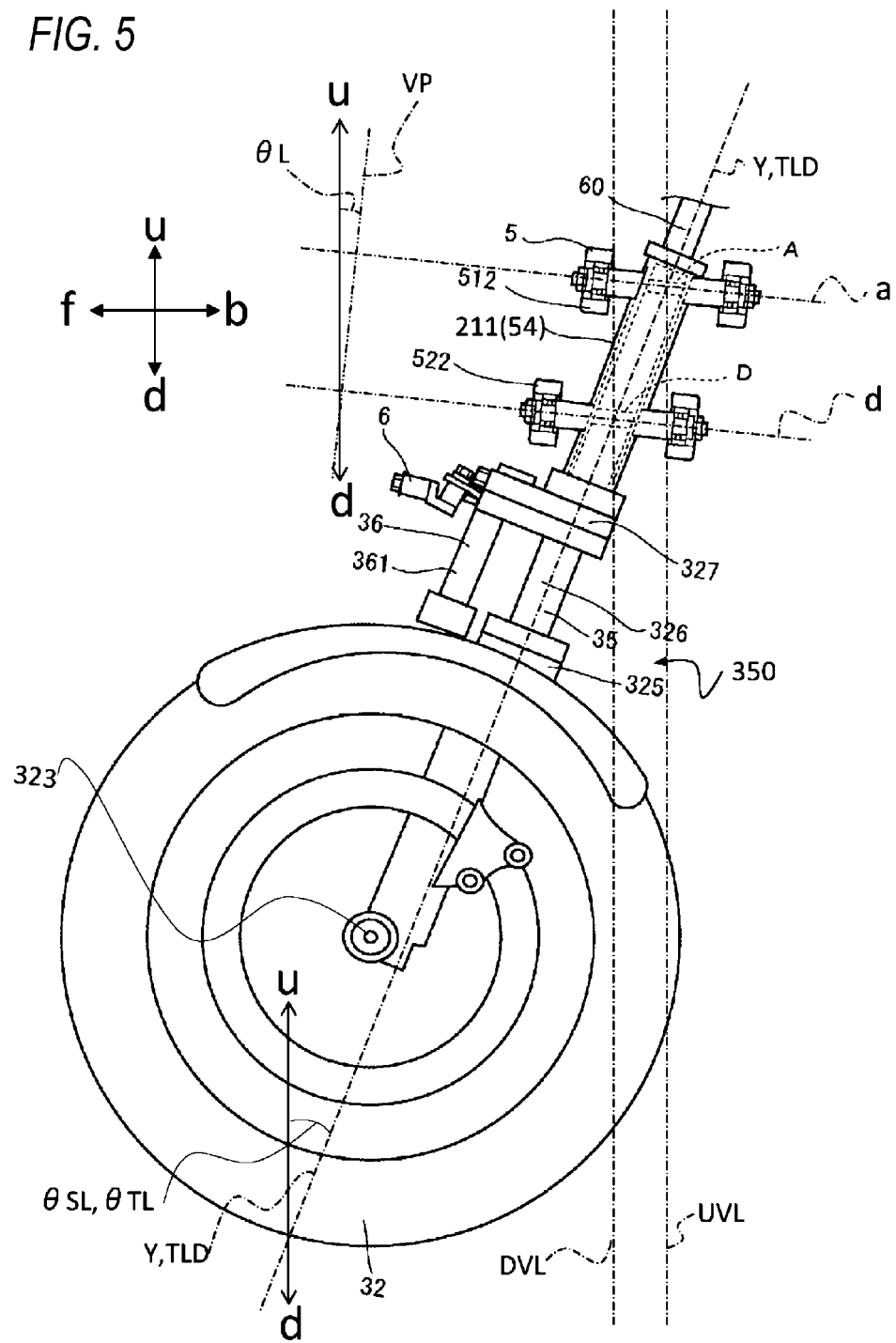
FIG. 5 is a partial side view of the vehicle of FIG. 1.

FIG. 5 is a left side view in the front-rear direction of the vehicle body frame 21 in the same manner as in FIG. 3.

FIG. 5 shows an acute angle θL defined by a virtual plane VP perpendicularly or substantially perpendicularly intersecting with the upper axis a of the upper cross member 51 and the lower axis d of the lower cross member 52, an acute angle θTL defined by the expansion and contraction direction of the left telescopic element 35 and the up-and-down direction of the vehicle body frame 21, and an acute angle θSL defined by the left axis Y of the left side rod 54 and the up-and-down direction of the vehicle body frame 21.

FIG. 5 shows the head pipe 211. As described above, the direction in which the left side rod 54 and the right side rod 53 extend coincides with the direction in which the head pipe 211 extends. Thus, an axis of the head pipe 211 of FIG. 5 coincides with the left axis Y of the left side rod 54. The left axis Y of the left side rod 54 coincides with the expansion and contraction direction TLD of the left telescopic element 35. The acute angle θTL defined by the expansion and contraction direction TLD of the left telescopic element 35 and the up-and-down direction of the vehicle body frame 21 is equivalent or substantially equivalent to the acute angle θSL defined by the left axis Y of the left side rod 54 and the up-and-down direction of the vehicle body frame 21. The size of the acute angle θTL defined by the expansion and contraction direction TLD of the left telescopic element 35 and the up-and-down direction of the vehicle body frame 21 is greater than the size of the acute angle θL defined by the virtual plane VP perpendicularly or substantially perpendicularly intersecting with the upper axis a of the upper cross member 51 and the lower axis d of the lower cross member 52. The size of the acute angle θL defined by the virtual plane VP perpendicularly or substantially perpendicularly intersecting with the upper axis a of the upper cross member 51 and the lower axis d of the lower cross member 52 is smaller than the size of the acute angle θSL defined by the left axis Y of the left side rod 54 and the up-and-down direction of the vehicle body frame 21.

FIG. 5 is a diagram showing the upright state of the vehicle body frame, and shows a relationship between the link mechanism 5, the left telescopic element 35, and the vehicle body frame 21, and the link mechanism 5, the right telescopic element 33, and the vehicle body frame 21 have the same relationship.

The right axis X of the right side rod 53 coincides with an expansion and contraction direction TRD of the right telescopic element 33. An acute angle θTR defined by the expansion and contraction direction TRD of the right telescopic element 33 and the up-and-down direction of the vehicle body frame 21 is equivalent or substantially equivalent to an acute angle θSR defined by the left axis X of the right side rod 53 and the up-and-down direction of the vehicle body frame 21. The size of the acute angle θTR defined by the expansion and contraction direction TRD of the right telescopic element 33 and the up-and-down direction of the vehicle body frame 21 is greater than the size of the acute angle θL defined by the virtual plane VP perpendicularly or substantially perpendicularly intersecting with the upper axis a of the upper cross member 51 and the lower axis d of the lower cross member 52. The size of the acute angle θL defined by the virtual plane VP perpendicularly or substantially perpendicularly intersecting with the upper axis a of the upper cross member 51 and the lower axis d of the lower cross member 52 is smaller than the size of the acute angle θSR defined by the right axis X of the right side rod 53 and the up-and-down direction of the vehicle body frame 21.

In FIG. 5, a virtual line DVL is parallel or substantially parallel with the up-and-down direction of the vehicle body frame 21 which passes through an intersection of left axis Y of the left side rod 54 and the lower cross member 52. In a side view of the upright state of the vehicle body frame, the intersection of left axis Y of the left side rod 54 and the lower cross member 52 is positioned in front of the rear end of the left front wheel 32 in the front-rear direction of the vehicle body frame 21. In addition, in FIG. 5, a virtual line UVL is parallel or substantially parallel with the up-and-down direction of the vehicle body frame 21 which passes through an intersection of the left axis Y of the left side rod 54 and the upper cross member 51. In a side view of the upright state of the vehicle body frame, the intersection of the left axis Y of the left side rod 54 and the upper cross member 51 is positioned in front of the rear end of the left front wheel 32 in the front-rear direction of the vehicle body frame 21.

In a side view of the upright state of the vehicle body frame, an intersection of the right axis X of the right side rod 53 and the lower cross member 52 is positioned in front of the rear end of the right front wheel 31 in the front-rear direction of the vehicle body frame 21. In a side view of the upright state of the vehicle body frame, an intersection of the right axis X of the right side rod 53 and the upper cross member 51 is positioned in front of the rear end of the right front wheel 31 in the front-rear direction of the vehicle body frame 21.

In the vehicle 1 described above, the right front wheel 31 and the left front wheel 32 are linearly displaced in the expansion and contraction direction TRD of the right telescopic element 33 and the expansion and contraction direction TLD of the left telescopic element 35. Accordingly, a stroke length of the right front wheel 31 and the left front wheel 32 in the up-and-down direction of the vehicle body frame 21 due to the operation of the right shock absorbing device 330 and the left shock absorbing device 350 is large. Thus, it is possible to improve the riding comfort. In addition, the acute angle θTL defined by the expansion and contraction direction TLD of the left telescopic element 35 and the up-and-down direction of the vehicle body frame 21 is equivalent or substantially equivalent to the acute angle θSL defined by the left axis Y of the left side rod 54 and the up-and-down direction of the vehicle body frame 21. The size of the acute angle θTL defined by the expansion and contraction direction TLD of the left telescopic element 35 and the up-and-down direction of the vehicle body frame 21 is greater than the size of the acute angle θL defined by the virtual plane VP perpendicularly or substantially perpendicularly intersecting with the upper axis a of the upper cross member 51 and the lower axis d of the lower cross member 52. The size of the acute angle θL defined by the virtual plane VP perpendicularly or substantially perpendicularly intersecting with the upper axis a of the upper cross member 51 and the lower axis d of the lower cross member 52 is smaller than the size of the acute angle θSL defined by the left axis Y of the left side rod 54 and the up-and-down direction of the vehicle body frame 21. An acute angle θTR defined by the expansion and contraction direction TRD of the right telescopic element 33 and the up-and-down direction of the vehicle body frame 21 is equivalent or substantially equivalent to an acute angle θSR defined by the left axis X of the right side rod 53 and the up-and-down direction of the vehicle body frame 21. The size of the acute angle θTR defined by the expansion and contraction direction TRD of the right telescopic element 33 and the up-and-down direction of the vehicle body frame 21 is greater than the size of the acute angle θL defined by the virtual plane VP perpendicularly or substantially perpendicularly intersecting with the upper axis a of the upper cross member 51 and the lower axis d of the lower cross member 52. The size of the acute angle θL defined by the virtual plane VP perpendicularly or substantially perpendicularly intersecting with the upper axis a of the upper cross member 51 and the lower axis d of the lower cross member 52 is smaller than the size of the acute angle θSR defined by the right axis X of the right side rod 53 and the up-and-down direction of the vehicle body frame 21. Thus, it is possible to increase a movable range of the front wheels due to the operation of the right shock absorbing device 330 and the left shock absorbing device 350 by using a movable range of the link mechanism 5, and to overlap the movable ranges of the front wheels due to the operation of the right shock absorbing device 330 and the left shock absorbing device 350 with the movable range of the link mechanism 5 as much as possible. Therefore, it is possible to prevent the increase of the movable ranges of the right front wheel 31 and the left front wheel 32 in the front-rear direction. By doing so, it is possible to provide the vehicle 1 including the leanable vehicle body frame 21 and the two front wheels 31 and 32 which improves the riding comfort and prevents an increase in size of the entire vehicle 1 in the front-rear direction.

In addition, in a side view of the upright state of the vehicle body frame, the intersection of the left axis Y of the left side rod 54 and the lower cross member 52 is positioned in front of the rear end of the left front wheel 32 in the front-rear direction of the vehicle body frame 21. In a side view of the upright state of the vehicle body frame, an intersection of the right axis X of the right side rod 53 and the lower cross member 52 is positioned in front of the rear end of the right front wheel 31 in the front-rear direction of the vehicle body frame 21. Thus, it is possible to increase the stroke length of the right front wheel 31 and the left front wheel 32 in the up-and-down direction of the vehicle body frame 21 due to the operation of the right shock absorbing device 330 and the left shock absorbing device 350, and to prevent the increase of the movable ranges of the right front wheel 31 and the left front wheel 32 in the front-rear direction. By doing so, it is possible to provide the vehicle 1 including the leanable vehicle body frame 21 and the two front wheels 31 and 32 which improves the riding comfort and prevents an increase in size of the entire vehicle 1 in the front-rear direction.

In addition, in a side view of the upright state of the vehicle body frame, the intersection of the left axis Y of the left side rod 54 and the upper cross member 51 is positioned in front of the rear end of the left front wheel 32 in the front-rear direction of the vehicle body frame 21. In a side view of the upright state of the vehicle body frame, an intersection of the right axis X of the right side rod 53 and the upper cross member 51 is positioned in front of the rear end of the right front wheel 31 in the front-rear direction of the vehicle body frame 21. By doing so, it is possible to provide the vehicle 1 including the leanable vehicle body frame 21 and the two front wheels 31 and 32 which improves the riding comfort and prevents an increase in size of the entire vehicle 1 in the front-rear direction.

Second Preferred Embodiment

Hereinafter, a vehicle 1001 according to a second preferred embodiment of the present invention will be described with reference to FIG. 6 to FIG. 12. In the present preferred embodiment, as an example of the vehicle, a three-wheeled vehicle including a leanable vehicle body frame, two front wheels, and one rear wheel (hereinafter, referred to as a vehicle) is exemplified.

Figure 6:
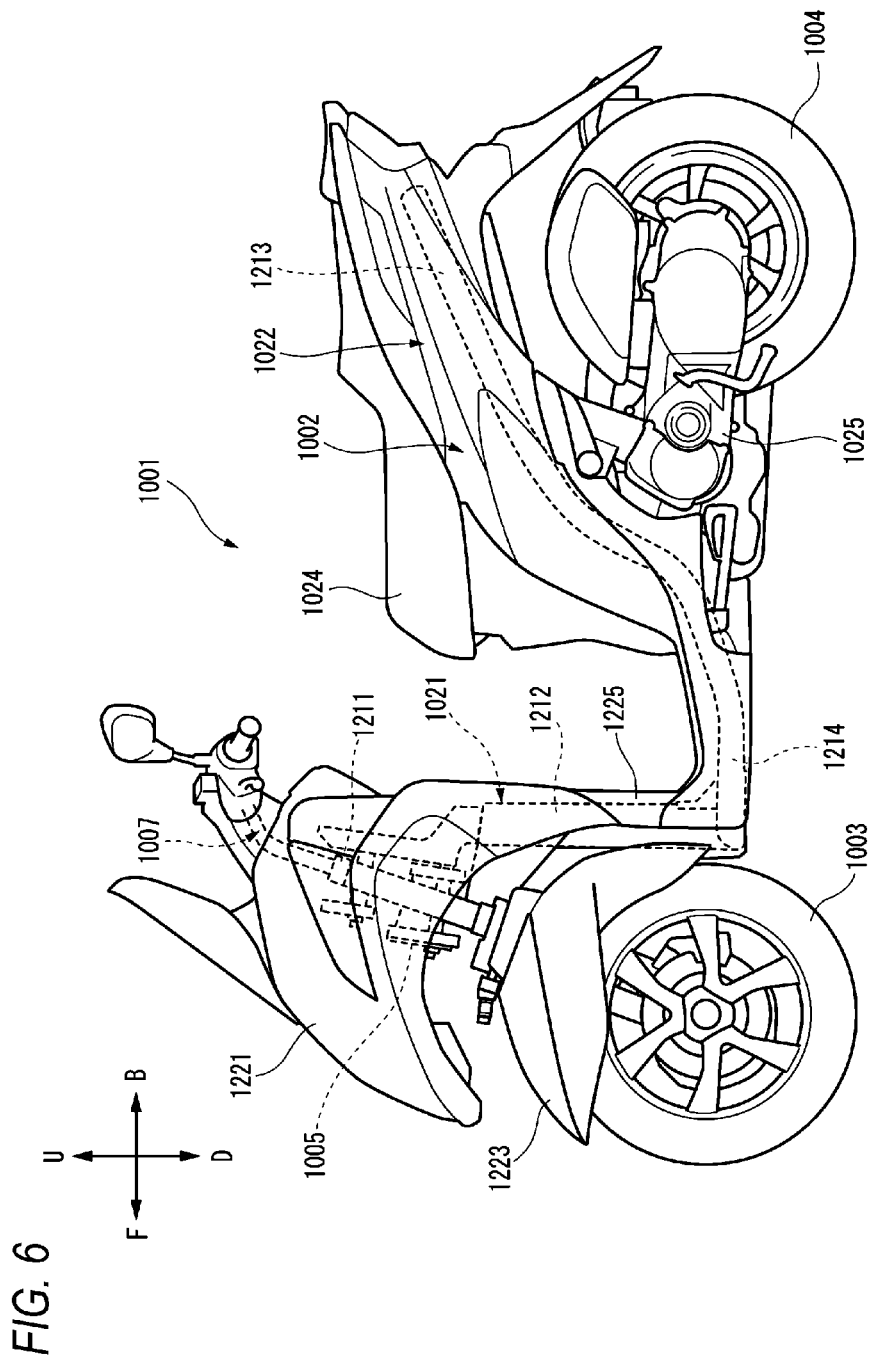
FIG. 6 is a side view of a vehicle according to a second preferred embodiment of the present invention.

FIG. 6 is a side view of the entire vehicle 1001 when the vehicle 1001 is seen from the left. Hereinafter, an arrow F in the drawing indicates a forward direction of the vehicle 1001 and an arrow B indicates a rear direction of the vehicle 1001. An arrow U indicates upward of the vehicle 1001 and an arrow D indicates downward of the vehicle 1001. An arrow R in the drawings indicates a right direction of the vehicle 1001 and an arrow L indicates a left direction of the vehicle 1001. In a state where the vehicle 1001 is leaning, the vehicle 1001 leans with respect to the up-and-down direction of a vehicle body frame 1021 in a front view. Hereinafter, an arrow r in the drawing indicates a right direction of the vehicle body frame 1021 and an arrow l indicates a left direction of the vehicle body frame 1021. An arrow u indicates upward of the vehicle body frame 1021 and an arrow d indicates downward of the vehicle body frame 1021. In a state where the vehicle 1001 is leaning, the vehicle body frame 1021 coincides with the up-and-down direction of the vehicle body frame 1021 in a front view. The directions of front, rear, right, and left in the description indicates directions of front, rear, right, and left as seen from a rider on the vehicle 1001. The center in a vehicle width direction indicates a center position of the vehicle 1001 in a vehicle width direction. The sideward of the vehicle width direction indicates leftward or rightward from the center in the vehicle width direction. In FIG. 6 to FIG. 12, an axis extending in the front-rear direction does not necessarily indicate an axis parallel with the front-rear direction. The axis extending in a front-rear direction preferably is an axis which is inclined in a range of about ±45°, for example, with respect to the front-rear direction. In the same manner as described above, an axis extending in an up-and-down direction preferably is an axis which is inclined in a range of about ±45°, for example, with respect to the up-and-down direction. An axis extending in a left-and-right direction preferably is an axis which is inclined in a range of about ±45°, for example, with respect to the left-and-right direction. In addition, an upright state of the vehicle body frame 1021 indicates a state in which a rider is not riding the vehicle, the vehicle 1001 is not filled with fuel, and the front wheels are not steered or leaned. In the upright state of the vehicle body frame 1021, the up-and-down direction of the vehicle body frame 1021 and the up-and-down direction of the vehicle 1001 coincide with each other.

As shown in FIG. 6, the vehicle 1001 includes a vehicle main body unit 1002, a pair of right and left front wheels 1003, a rear wheel 1004, a steering mechanism 1007, and a link mechanism 1005. The vehicle main body unit 1002 includes the vehicle body frame 1021, a vehicle body cover 1022, a seat 1024 and a power unit 1025.

The body frame 1021 includes a head pipe 1211, a down frame 1212, an under-frame 1214, and a rear frame 1213. In FIG. 6, a portion of the vehicle body frame 1021 covered by the vehicle body cover 1022 is shown with a dashed line. The vehicle body frame 1021 supports the power unit 1025, the seat 1024, and the like. The power unit 1025 includes a driving source such as an engine or an electric motor, a transmission, and the like.

The head pipe 1211 is disposed in a front portion of the vehicle 1001. The head pipe 1211 is inclined with respect to the vertical direction, so that an upper portion thereof is positioned behind the lower portion thereof. The steering mechanism 1007 and the link mechanism 1005 are disposed in the vicinity of the head pipe 1211. A steering shaft 1060 of the steering mechanism 1007 is turnably inserted into the head pipe 1211. The head pipe 1211 supports the link mechanism 1005.

The vehicle body frame 1021 is covered with the vehicle body cover 1022. The vehicle body cover 1022 includes a front cover 1221, a pair of right and left front fenders 1223, and a leg shield 1225.

The front cover 1221 is positioned directly in front of the seat 1024. The front cover 1221 covers at least a portion of the steering mechanism 1007 and the link mechanism 1005.

Figure 7:
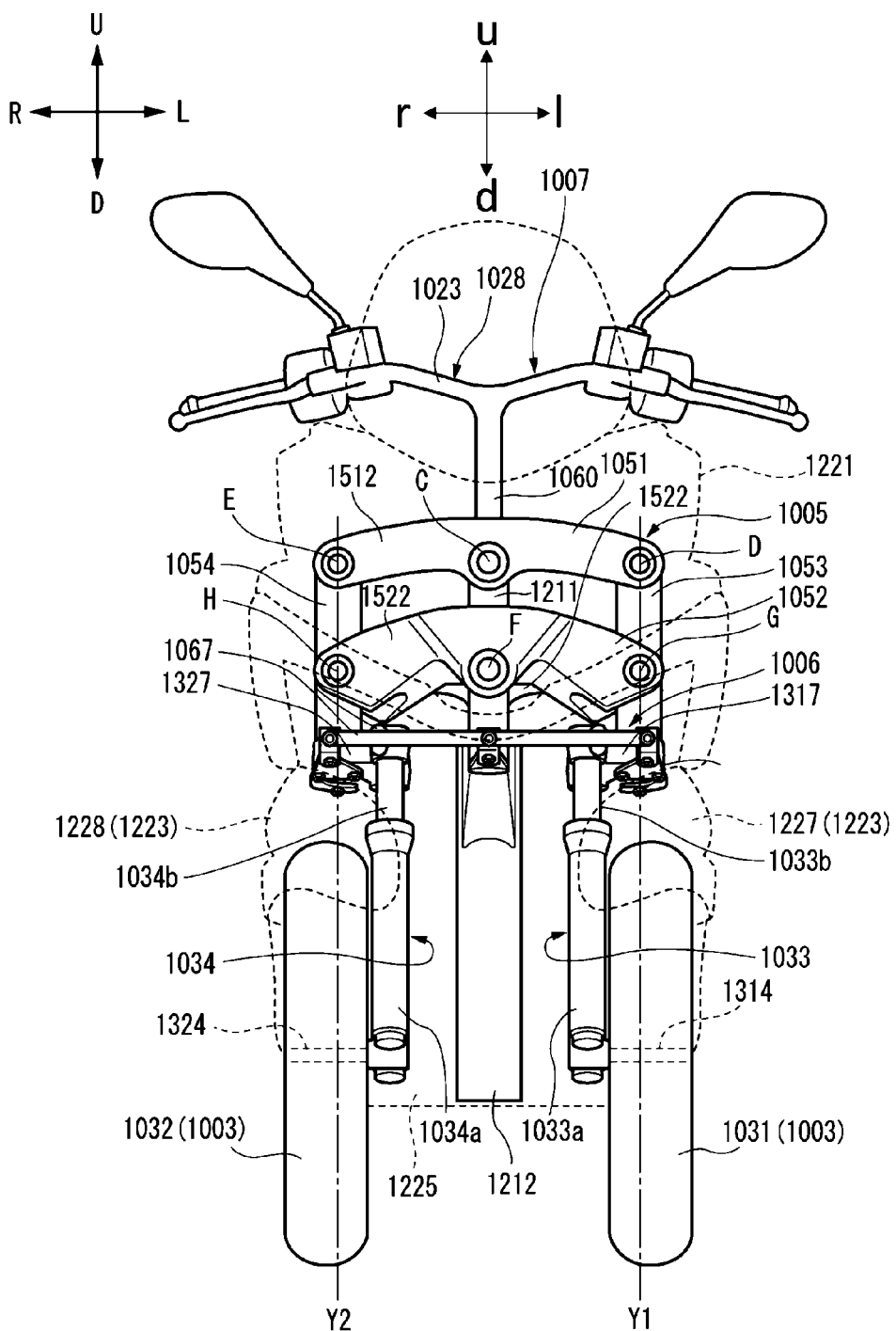
FIG. 7 is a front view of a front portion of the vehicle of FIG. 6.
Figure 8:
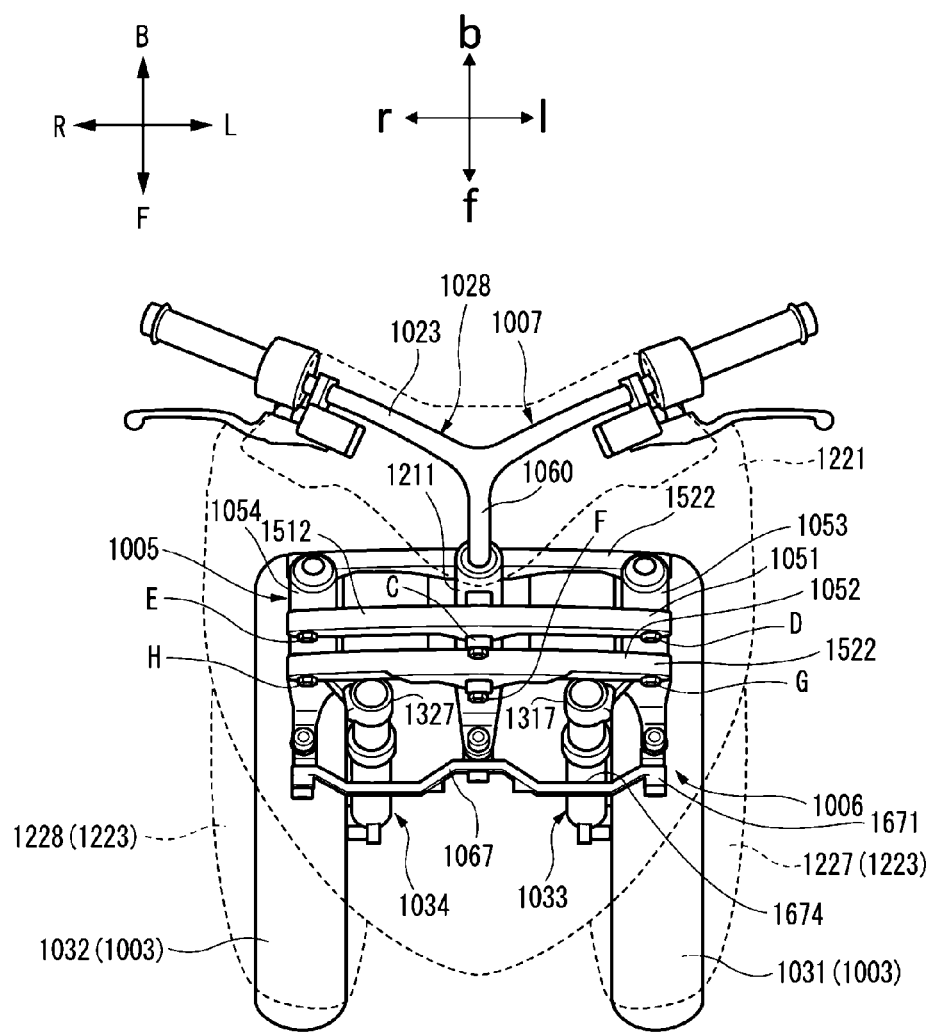
FIG. 8 is a plan view of the front portion of the vehicle of FIG. 6.

FIG. 7 is a front view of the front portion of the vehicle 1001 of FIG. 6 which is seen from the front. FIG. 8 is a plan view of the front portion of the vehicle 1001 of FIG. 6 which is seen from above. FIG. 7 and FIG. 8 show the state in which the vehicle body cover 1022 is seen through. As shown in FIG. 7 and FIG. 8, the steering mechanism 1007 includes a steering force transmission mechanism 1006, a left shock absorbing device 1033, a right shock absorbing device 1034, and the pair of right and left front wheels 1003.

The pair of right and left front wheels 1003 includes a left front wheel 1031 and a right front wheel 1032. The left front wheel 1031 is disposed to the left with respect to the center in the vehicle width direction. The right front wheel 1032 is disposed to the right of the center in the vehicle width direction. In the upright state, the left front wheel 1031 is symmetrical to the right front wheel 1032, with respect to the center in the vehicle width direction. In addition, a left front fender 1227 is disposed above the left front wheel 1031. A right front fender 1228 is disposed above the right front wheel 1032. The left front wheel 1031 is supported by the left shock absorbing device 1033. The right front wheel 1032 is supported by the right shock absorbing device 1034.

The left shock absorbing device 1033 attenuates vibration from a road surface. The left shock absorbing device 1033 includes a left telescopic element 1036. The left telescopic element 1036 includes an upper portion 1033b and a lower portion 1033a. The lower portion 1033a of the left telescopic element 1036 is positioned directly in front of the upper portion 1033b in the front-rear direction of the vehicle body frame 1021. The left telescopic element 1036 supports the left front wheel 1031 by the lower portion 1033a, and expands, contracts, and attenuates the displacement of the left front wheel 1031 with respect to the upper portion 1033b in the up-and-down direction of the vehicle body frame 1021. The left shock absorbing device 1033 includes the left telescopic element 1036 and a left turning prevention mechanism 1035. The left turning prevention mechanism 1035 includes a lower portion 1033a and an upper portion 1033b. The left front wheel 1031 is supported by the lower portion 1033a. The first lower portion 1033a extends in the up-and-down direction and a rotation shaft 1314 of the left front wheel is supported at the lower end portion thereof. The rotation shaft 1314 of the left front wheel supports the left front wheel 1031. The upper portion 1033b is disposed directly above the lower portion 1033a, in a state where a portion thereof is inserted into the lower portion 1033a. The upper portion 1033b is able to turn relatively with respect to the lower portion 1033a in the direction in which the lower portion 1033a extends. The upper portion of the upper portion 1033b is fixed to a left bracket 1317. The upper portion 1033b is disposed directly above the lower portion 1033a in a state where a portion thereof is inserted into the lower portion 1033a. The upper portion 1033b is able to turn relatively with respect to the lower portion 1033a in a direction in which the lower portion 1033a extends. The upper portion of the upper portion 1033b is fixed to the left bracket 1317. The upper portion 1033b and the upper portion 1033b of the left shock absorbing device 1033 are fixed to the left bracket 1317.

The left telescopic element 1036 and the left turning prevention mechanism 1035 are connected parallel or substantially parallel to each other at the front and the back. Accordingly, the relative turning of the lower portion 1033a of the left telescopic element 1036 with respect to the upper portion 1033b is prevented.

The right shock absorbing device 1034 attenuates the vibration from the road surface. The right shock absorbing device 1034 includes a right telescopic element 1038. The right telescopic element 1038 includes an upper portion 1034b and a lower portion 1034a. The lower portion 1034a of the right telescopic element 1038 is positioned in front of the upper portion 1034b in the front-rear direction of the vehicle body frame 1021. The right telescopic element 1038 supports the right front wheel 1032 by the lower portion 1034a, and expands, contracts, and attenuates the displacement of the right front wheel 1032 with respect to the upper portion 1034b in the up-and-down direction of the vehicle body frame 1021. The right shock absorbing device 1034 includes the right telescopic element and the right turning prevention mechanism 1037. The right turning prevention mechanism 1037 includes a lower portion 1034a and an upper portion 1034b. The right front wheel 1032 is supported by the lower portion 1034a. The lower portion 1034a extends in the up-and-down direction and a rotation shaft 1324 of the right front wheel is supported at the lower end portion thereof. The rotation shaft 1324 of the right front wheel supports the right front wheel 1032. The upper portion 1034b is disposed directly above the lower portion 1034a, in a state where a portion thereof is inserted into the lower portion 1034a. The upper portion 1034b is able to turn relatively with respect to the lower portion 1034a in the direction in which the lower portion 1034a extends. The upper portion of the upper portion 1034b is fixed to a right bracket 1327. The upper portion 1034b is disposed directly above the lower portion 1034a in a state where a portion thereof is inserted into the lower portion 1034a. The upper portion 1034b is able to turn relatively with respect to the lower portion 1034a in a direction in which the lower portion 1034a extends. The upper portion of the upper portion 1034b is fixed to the right bracket 1327. The upper portion 1034b and the upper portion 1034b of the right shock absorbing device 1034 are fixed to the right bracket 1327.

The right telescopic element 1038 and the right turning prevention mechanism 1037 are connected parallel or substantially parallel to each other at the front and the back. Accordingly, the relative turning of the lower portion 1034a of the right telescopic element 1038 with respect to the upper portion 1034b is prevented.

The steering force transmission mechanism 1006 is disposed directly above the left front wheel 1031 and the right front wheel 1032. The steering force transmission mechanism 1006 includes a steering member 1028 as a member to input a steering force of a rider. The steering member 1028 includes the steering shaft 1060 and a handlebar 1023 connected to the upper portion of the steering shaft 1060. The steering shaft 1060 is supported by the vehicle body frame. The lower end portion of the steering shaft 1060 is positioned directly in front of the upper end portion in the front-rear direction of the vehicle body frame 1021. The steering shaft 1060 is positioned so that a portion thereof is inserted into the head pipe 1211 and the steering shaft extends in the up-and-down direction. The steering shaft 1060 is able to turn around an intermediate axis extending in the up-and-down direction of the vehicle body frame 1021. The steering shaft 1060 is turned in accordance with the operation of the handlebar 1023 by a rider.

The steering force transmission mechanism 1006 includes a turning transmission mechanism. The turning transmission mechanism transmits the turning motion of the steering shaft 1060 according to the operation of the handlebar 1023 to the left shock absorbing device 1033 and the right shock absorbing device 1034. The turning transmission mechanism includes a tie rod 1067.

In the vehicle 1001, the link mechanism 1005 including a four-bar linkage (also referred to as a parallelogram linkage) system is preferably used.

The link mechanism 1005 is disposed below the handlebar 1023. The link mechanism 1005 is supported by the head pipe 1211 of the vehicle body frame 1021. The link mechanism 1005 includes an upper cross member 1051, a lower cross member 1052, a left side rod 1053, and a right side rod 1054, as a configuration to perform the leaning operation of the vehicle 1001. In addition, the link mechanism 1005 includes the left shock absorbing device 1033 which is disposed directly below the left side rod 1053 and leans with the left side rod 1053. Further, the link mechanism 1005 includes the right shock absorbing device 1034 which is disposed directly below the right side rod 1054 and leans with the right side rod 1054.

The upper cross member 1051 is supported by the head pipe 1211 with a support C. The upper cross member 1051 is able to turn around an upper axis extending in the front-rear direction of the vehicle body frame 1021.

The left end portion of the upper cross member 1051 is supported by the left side rod 1053 with a support D. The upper cross member 1051 is able to turn around a turning axis along the front-rear direction of the vehicle body frame 1021 with respect to the left side rod 1053. The right end portion of the upper cross member 1051 is supported by the right side rod 1054 with a support E. The upper cross member 1051 is able to turn around a turning axis along the front-rear direction of the vehicle body frame 1021 with respect to the right side rod 1054. The upper cross member 1051 includes an upper cross member 1512 which is disposed directly in front of the head pipe 1211 and extends in the vehicle width direction.

The lower cross member 1052 is supported by the head pipe 1211 with a support F. The lower cross member 1052 is supported to be turnable around a lower axis extending in the front-rear direction of the vehicle body frame 1021. The lower cross member 1052 is disposed below the upper cross member 1051. The lower cross member 1052 preferably has approximately the same length in the vehicle width direction as the upper cross member 1051 and is parallel or substantially parallel with the upper cross member 1051. The left end of the lower cross member 1052 is supported by the left side rod 1053 with a support G. The lower cross member 1052 is able to turn around a turning axis along the front-rear direction of the vehicle body frame 1021 with respect to the left side rod 1053. The right end portion of the lower cross member 1052 is supported by the right side rod 1054 with a support H. The lower cross member 1052 is able to turn around a turning axis along the front-rear direction of the vehicle body frame 1021 with respect to the right side rod 1054.

The lower cross member 1052 includes a pair of lower cross members 1522 which extend in the vehicle width direction. The pair of lower cross members 1522 includes the head pipe 1211 interposed therebetween in the front-rear direction.

The left side rod 1053 is disposed directly to the left of the head pipe 1211 and extends parallel or substantially parallel with the direction in which the head pipe 1211 extends. The left side rod 1053 is disposed above the left front wheel 1031 and above the left shock absorbing device 1033. The left side rod 1053 is supported by a left side rod support 1317b of the left bracket 1317 and is attached with respect to the left bracket 1317 so as to be turnable around a left center shaft Y1.

The right side rod 1054 is disposed directly to the right of the head pipe 1211 and extends parallel or substantially parallel with the direction in which the head pipe 1211 extends. The right side rod 1054 is disposed above the right front wheel 1032 and above the right shock absorbing device 1034. The right side rod 1054 is supported by a right side rod support 1327b of the right bracket 1327 and is attached with respect to the right bracket 1327 so as to be turnable around a right center shaft Y2.

As described above, the upper cross member 1051, the lower cross member 1052, the left side rod 1053, and the right side rod 1054 are linked to each other so that the upper cross member 1051 and the lower cross member 1052 maintain a posture parallel or substantially parallel with each other and the left side rod 1053 and the right side rod 1054 maintain a posture parallel or substantially parallel with each other.

Figure 9:
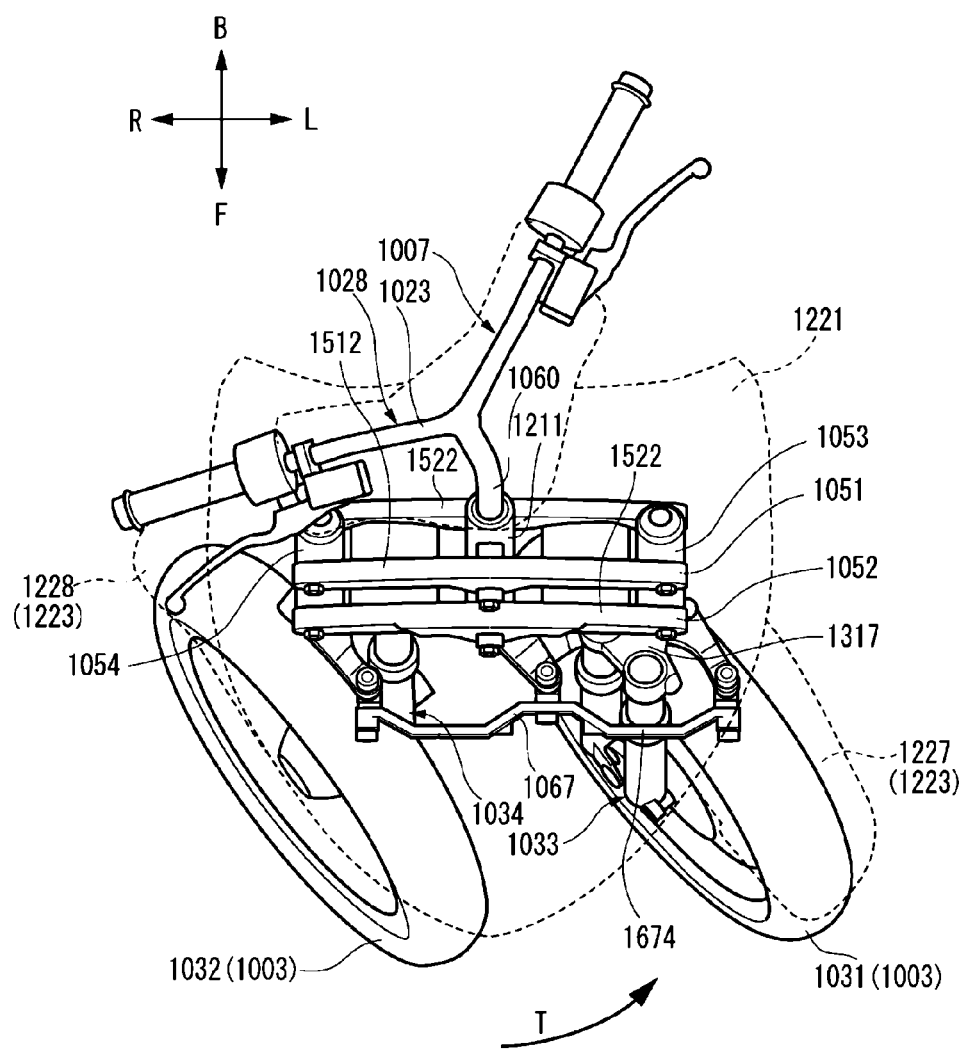
FIG. 9 is a plan view of the front portion of the vehicle in a state where the vehicle of FIG. 6 is being steered.

FIG. 9 is a diagram for illustrating the steering operation of the vehicle 1001 and is a plan view of the front portion of the vehicle in a state where the vehicle 1001 is steered.

As shown in FIG. 9, when the handlebar 1023 is turned in a direction of an arrow T, the steering shaft 1060 turns. When the steering shaft 1060 turns, the tie rod 1067 moves leftward and rearward. When the tie rod 1067 moves leftward and rearward, the left front wheel 1031 turns around the left center axis Y1 through the left shock absorbing device 1033, and the right front wheel 1032 turns around the right center shaft Y2 through the right shock absorbing device 1034.

Figure 10:
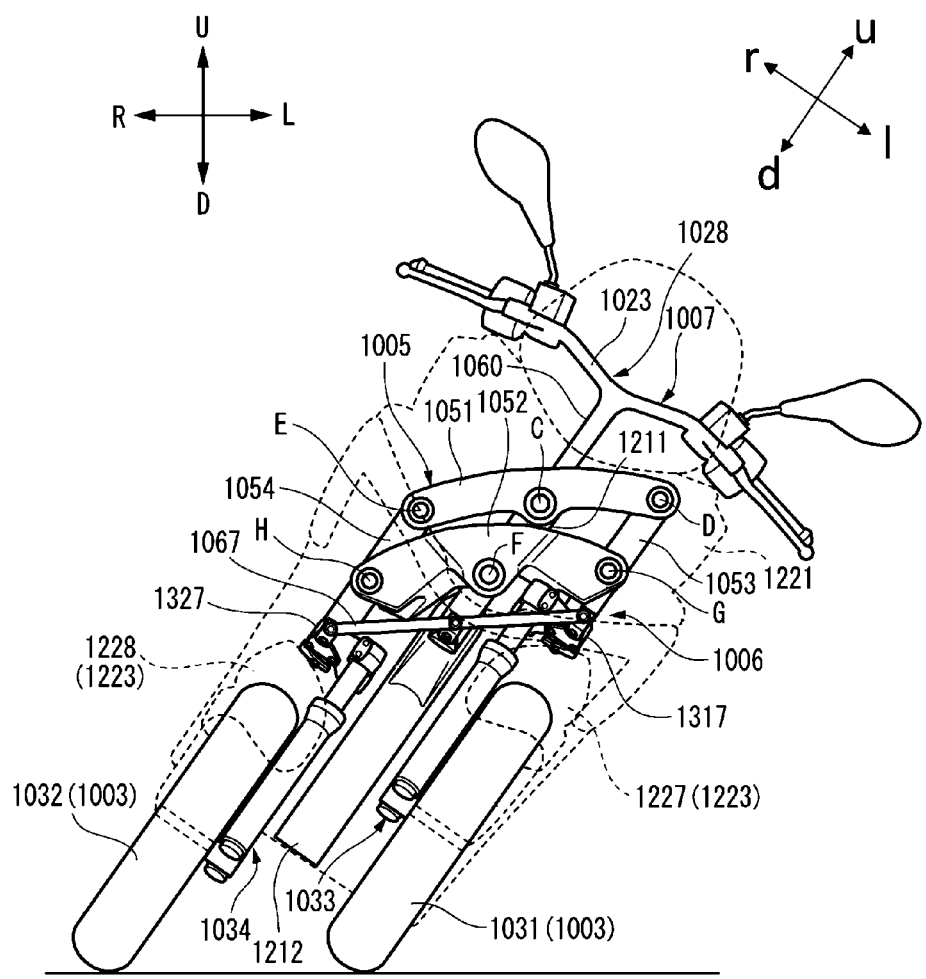
FIG. 10 is a front view of the front portion of the vehicle in a state where the vehicle of FIG. 6 is leaning.

FIG. 10 is a diagram for illustrating the leaning operation of the vehicle 1001 and is a front view of the front portion of the vehicle in a state where the vehicle 1001 is leaned.

As shown in FIG. 10, the vehicle 1001 leans in the left-and-right direction in accordance with the operation of the link mechanism 1005. The operation of the link mechanism 1005 indicates the relative turning of each member (the upper cross member 1051, the lower cross member 1052, the left side rod 1053, and the right side rod 1054) to perform the leaning operation of the link mechanism 1005 and the change of the shape of the link mechanism 1005.

In the link mechanism 1005 of this example, the upper cross member 1051, the lower cross member 1052, the left side rod 1053, and the right side rod 1054 preferably have a rectangular or approximately rectangular shape in a front view in the upright state, for example, and are transformed to an parallelogram or approximately parallelogram shape in a state when the vehicle 1001 leans. The link mechanism 1005 performs the leaning operation in an interlocked manner with the relative turning operation of the upper cross member 1051, the lower cross member 1052, the left side rod 1053, and the right side rod 1054, and accordingly each of the first front wheel 1031 and the second front wheel 1032 leans.

For example, when a rider leans the vehicle 1001 leftward, the head pipe 1211 leans leftward with respect to the vertical direction. When the head pipe 1211 leans, the upper cross member 1051 turns around the support C with respect to the head pipe 1211, and the lower cross member 1052 turns around the support F with respect to the head pipe 1211. By doing so, the upper cross member 1051 moves leftward of the lower cross member 1052, and the left side rod 1053 and the right side rod 1054 lean with respect to the vertical direction while maintaining the parallel or substantially parallel state with the head pipe 1211. When the left side rod 1053 and the right side rod 1054 lean, the left side rod 1053 and the right side rod 1054 turn with respect to the upper cross member 1051 and the lower cross member 1052. Accordingly, when the vehicle 1001 leans, the left front wheel 1031 and the right front wheel 1032 supported by the left side rod 1053 and the right side rod 1054 lean with respect to the vertical direction while maintaining the parallel or substantially parallel state with the head pipe 1211, in accordance with the leaning of the left side rod 1053 and the right side rod 1054. In addition, the tie rod 1067 maintains the parallel or substantially parallel posture with respect to the upper cross member 1051 and the lower cross member 1052, even when the vehicle 1001 leans.

The link mechanism 1005 is disposed above the left front wheel 1031 and the right front wheel 1032. That is, the turning axes of the upper cross member 1051, the lower cross member 1052, the left side rod 1053, and the right side rod 1054 which are turning members of the link mechanism 1005 are disposed directly above the left front wheel 1031 and the right front wheel 1032.

Figure 11:
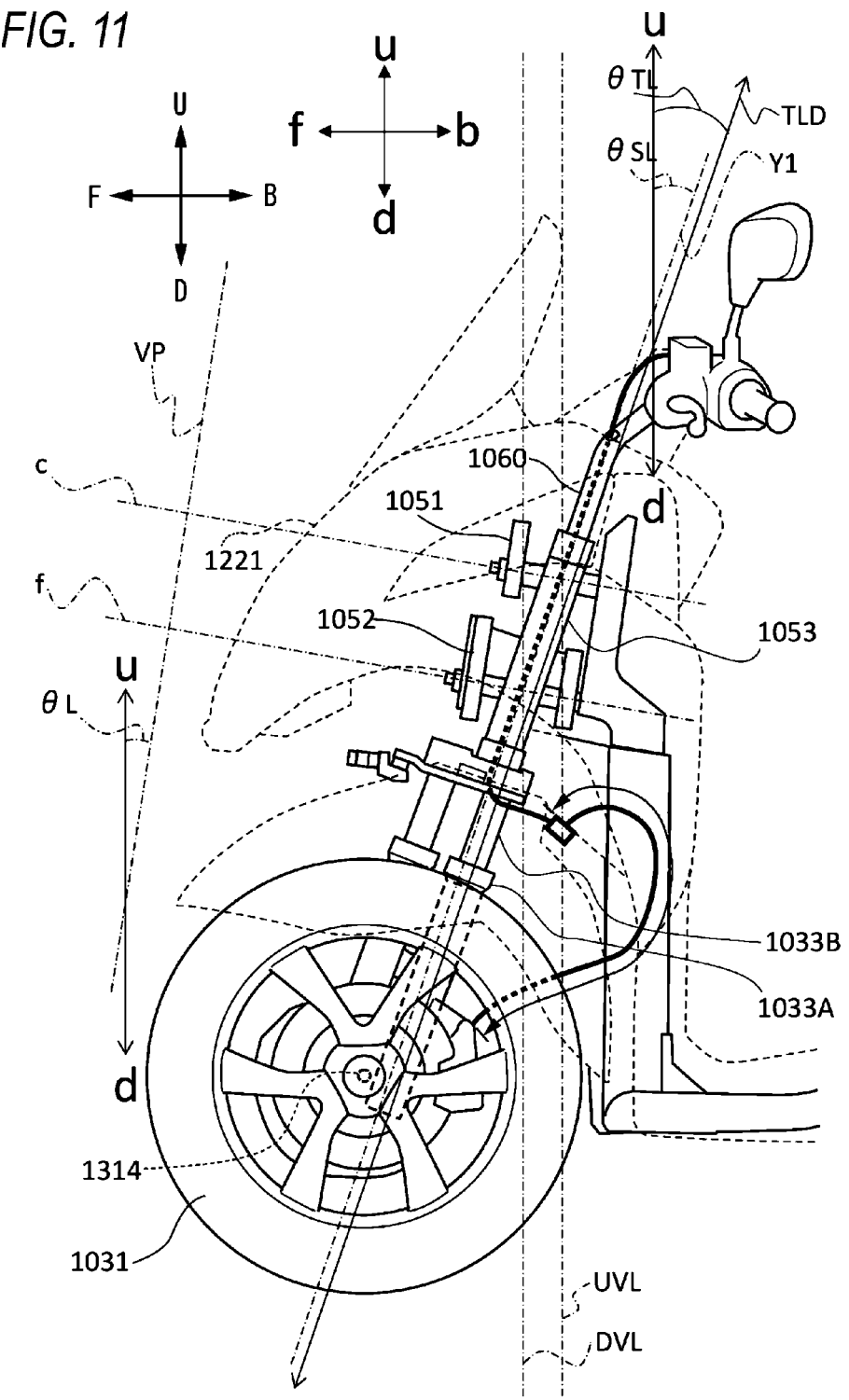
FIG. 11 is a side view of the front portion of the vehicle of FIG. 6.

FIG. 11 is a side view of the front portion of the vehicle in the upright state of the vehicle body frame.

FIG. 11 shows an acute angle θL defined by a virtual plane VP perpendicularly or substantially perpendicularly intersecting with an upper axis c of the upper cross member 1051 and an lower axis f of the lower cross member 1052, an acute angle θTL defined by the expansion and contraction direction of the left telescopic element 1036 and the up-and-down direction of the vehicle body frame 1021, and an acute angle θSL defined by the left axis Y1 of the left side rod 1053 and the up-and-down direction of the vehicle body frame 1021.

In the upright state of the vehicle body frame 1021, the acute angle θTL defined by the expansion and contraction direction TLD of the left telescopic element 1036 and the up-and-down direction of the vehicle body frame 1021 is equivalent or substantially equivalent to the acute angle θSL defined by the left axis Y1 of the left side rod 1053 and the up-and-down direction of the vehicle body frame 1021. The size of the acute angle θTL defined by the expansion and contraction direction TLD of the left telescopic element 1036 and the up-and-down direction of the vehicle body frame 1021 is greater than the size of the acute angle θL defined by the virtual plane VP perpendicularly or substantially perpendicularly intersecting with the upper axis c of the upper cross member 1051 and the lower axis f of the lower cross member 52. The size of the acute angle θL defined by the virtual plane VP perpendicularly or substantially perpendicularly intersecting with the upper axis c of the upper cross member 1051 and the lower axis f of the lower cross member 1052 is smaller than the size of the acute angle θSL defined by the left axis Y1 of the left side rod 1053 and the up-and-down direction of the vehicle body frame 1021.

FIG. 11 is a diagram showing the upright state of the vehicle body frame, and the right telescopic element 1038 and the right side rod 1054 preferably have the same relationship.

In the upright state of the vehicle body frame 1021, an acute angle θTR defined by the expansion and contraction direction TRD of the right telescopic element 1038 and the up-and-down direction of the vehicle body frame 1021 is equivalent or substantially equivalent to an acute angle θSR defined by the right axis Y2 of the right side rod 1054 and the up-and-down direction of the vehicle body frame 1021. The size of the acute angle θTR defined by the expansion and contraction direction TRD of the right telescopic element 1038 and the up-and-down direction of the vehicle body frame 1021 is greater than the size of the acute angle θL defined by the virtual plane VP perpendicularly or substantially perpendicularly intersecting with the upper axis c of the upper cross member 1051 and the lower axis f of the lower cross member 52. The size of the acute angle θL defined by the virtual plane VP perpendicularly or substantially perpendicularly intersecting with the upper axis c of the upper cross member 1051 and the lower axis f of the lower cross member 1052 is smaller than the size of the acute angle θSR defined by the right axis Y2 of the right side rod 1054 and the up-and-down direction of the vehicle body frame 1021.

In FIG. 11, a virtual line DVL is parallel or substantially parallel with the up-and-down direction of the vehicle body frame 1021 which passes through an intersection of left axis Y1 of the left side rod 1053 and the lower cross member 1052. In a side view of the upright state of the vehicle body frame, the intersection of left axis Y1 of the left side rod 1053 and the lower cross member 1052 is positioned in front of the rear end of the left front wheel 1031 in the front-rear direction of the vehicle body frame 1021. In addition, in FIG. 11, a virtual line UVL is parallel or substantially parallel with the up-and-down direction of the vehicle body frame 1021 which passes through an intersection of the left axis Y1 of the left side rod 1053 and the upper cross member 1051. In a side view of the upright state of the vehicle body frame, the intersection of the left axis Y1 of the left side rod 1053 and the upper cross member 51 is positioned in front of the rear end of the left front wheel 1031 in the front-rear direction of the vehicle body frame 1021.

In a side view of the upright state of the vehicle body frame, an intersection of the right axis Y2 of the right side rod 1054 and the lower cross member 1052 is in front of the rear end of the right front wheel 1032 in the front-rear direction of the vehicle body frame 1021. In a side view of the upright state of the vehicle body frame, an intersection of the right axis X of the right side rod 1054 and the upper cross member 1051 is positioned in front of the rear end of the right front wheel 1032 in the front-rear direction of the vehicle body frame 1021.

In FIG. 11, the acute angle θTL defined by the expansion and contraction direction TLD of the left telescopic element 1036 and the up-and-down direction of the vehicle body frame 1021 is equivalent or substantially equivalent to the acute angle θSL defined by the left axis Y1 of the left side rod 1053 and the up-and-down direction of the vehicle body frame 1021. In addition, the rotation axis 1314 of the left front wheel is positioned in front of the left axis Y1 of the left side rod 1053. The expansion and contraction direction TLD of the left telescopic element 1036 is positioned behind the rotation axis 1314 of the left front wheel.

The acute angle θTR defined by the expansion and contraction direction TRD of the right telescopic element 1038 and the up-and-down direction of the vehicle body frame 1021 is equivalent or substantially equivalent to the acute angle θSR defined by the right axis Y2 of the right side rod 1054 and the up-and-down direction of the vehicle body frame 1021. In addition, the rotation axis 1324 of the right front wheel is positioned in front of the right axis Y2 of the right side rod 1054. The expansion and contraction direction TRD of the right telescopic element 1038 is positioned behind the rotation axis 1324 of the right front wheel.

Figure 12:
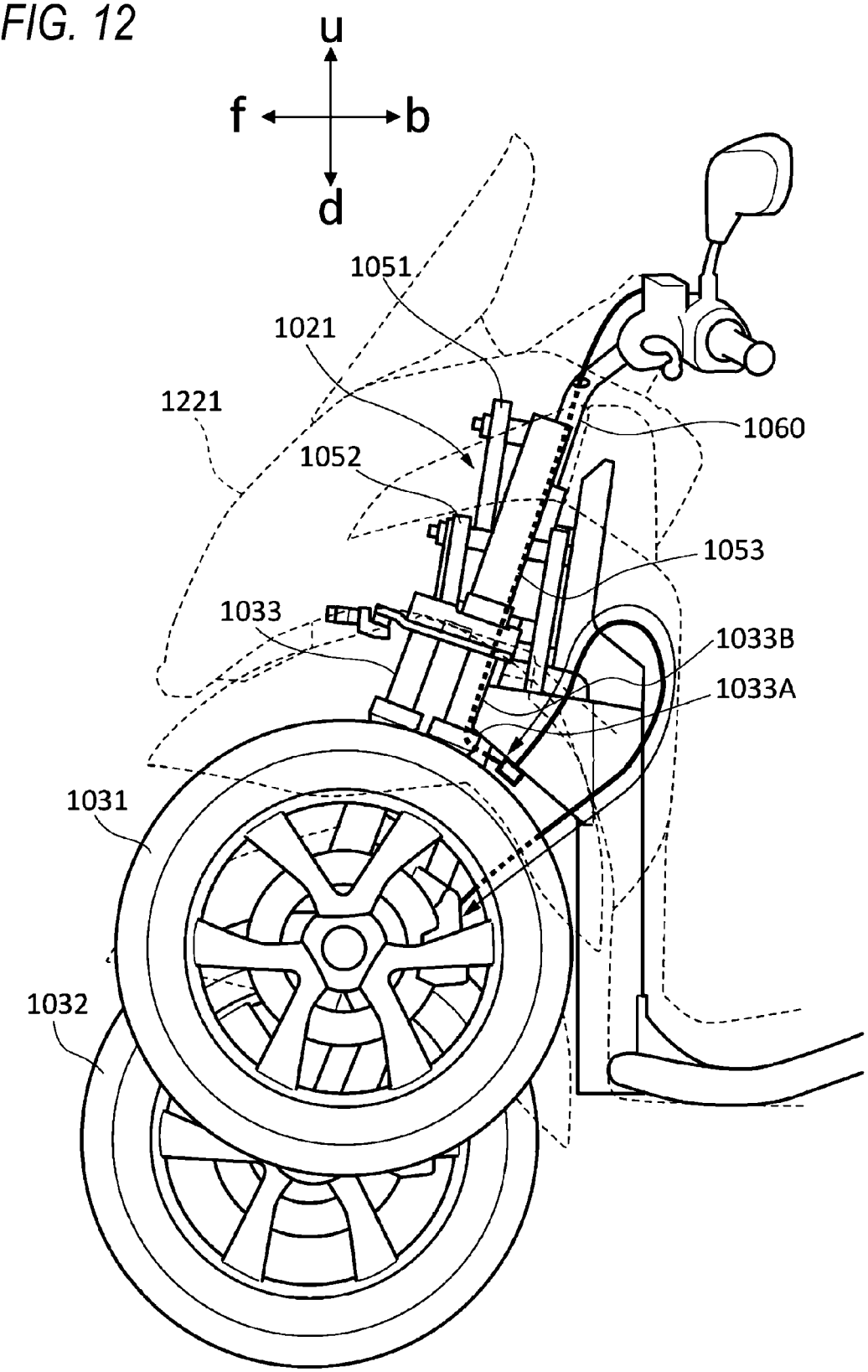
FIG. 12 is a side view of the front portion of the vehicle in a state where the vehicle of FIG. 6 is leaning.

FIG. 12 is a side view of the front portion of the vehicle in a state where the vehicle 1001 is leaned leftward. The upper end of the left front wheel 1031 is positioned directly above the upper end of the right front wheel 1032 in the up-and-down direction of the vehicle body frame 1021. The front end of the left front wheel 1031 is positioned behind the front end of the right front wheel 1032. Movable ranges of the left front wheel 1031 and the right front wheel 1032 in the front-rear direction are smaller than movable ranges of the left front wheel 1031 and the right front wheel 1032 in the up-and-down direction of the vehicle body frame 1021. With the vehicle 1001, an increase in size of the entire vehicle 1001 in the front-rear direction is prevented while improving the riding comfort by securing a large stroke length of the left front wheel 1031 and the right front wheel 1032 in the up-and-down direction of the vehicle body frame 1021.

In the vehicle 1001 described above, the right front wheel 1032 and the left front wheel 1031 are linearly displaced in the expansion and contraction direction TRD of the right telescopic element 1038 and the expansion and contraction direction TLD of the left telescopic element 1036. Accordingly, a stroke length of the right front wheel 1032 and the left front wheel 1031 in the up-and-down direction of the vehicle body frame 1021 due to the operation of the right shock absorbing device and the left shock absorbing device is large. Thus, it is possible to improve the riding comfort. In addition, the acute angle θTL defined by the expansion and contraction direction TLD of the left telescopic element 1036 and the up-and-down direction of the vehicle body frame 1021 is equivalent or substantially equivalent to the acute angle θSL defined by the left axis Y1 of the left side rod 1053 and the up-and-down direction of the vehicle body frame 1021. The size of the acute angle θTL defined by the expansion and contraction direction TLD of the left telescopic element 1036 and the up-and-down direction of the vehicle body frame 1021 is greater than the size of the acute angle θL defined by the virtual plane VP perpendicularly or substantially perpendicularly intersecting with the upper axis c of the upper cross member 1051 and the lower axis f of the lower cross member 52. The size of the acute angle θL defined by the virtual plane VP perpendicularly or substantially perpendicularly intersecting with the upper axis c of the upper cross member 1051 and the lower axis f of the lower cross member 1052 is smaller than the size of the acute angle θSL defined by the left axis Y1 of the left side rod 1053 and the up-and-down direction of the vehicle body frame 1021. The acute angle θTR defined by the expansion and contraction direction TRD of the right telescopic element 1038 and the up-and-down direction of the vehicle body frame 1021 is equivalent or substantially equivalent to the acute angle θSR defined by the right axis Y2 of the right side rod 1054 and the up-and-down direction of the vehicle body frame 1021. The size of the acute angle θTR defined by the expansion and contraction direction TRD of the right telescopic element 1038 and the up-and-down direction of the vehicle body frame 1021 is greater than the size of the acute angle θL defined by the virtual plane VP perpendicularly or substantially perpendicularly intersecting with the upper axis c of the upper cross member 1051 and the lower axis f of the lower cross member 52. The size of the acute angle θL defined by the virtual plane VP perpendicularly or substantially perpendicularly intersecting with the upper axis c of the upper cross member 1051 and the lower axis f of the lower cross member 1052 is smaller than the size of the acute angle θSR defined by the right axis Y2 of the right side rod 1054 and the up-and-down direction of the vehicle body frame 1021. By doing so, it is possible to prevent the increase of the movable ranges of the right front wheel 1032 and the left front wheel 1031 in the front-rear direction. It is possible to increase the movable ranges of the front wheels due to the operation of the right shock absorbing device 1034 and the left shock absorbing device 1033 by using a movable range of the link mechanism 1005, and to overlap the movable ranges of the front wheels due to the operation of the right shock absorbing device 1034 and the left shock absorbing device 1033 with the movable range of the link mechanism 1005 as much as possible. By doing so, it is possible to provide the vehicle 1001 including the leanable vehicle body frame 1021 and the two front wheels 1031 and 1032 which improves the riding comfort and prevents an increase in the size of the entire vehicle 1001 in the front-rear direction.

In addition, in a side view of the upright state of the vehicle body frame, the intersection of left axis Y1 of the left side rod 1053 and the lower cross member 52 is positioned in front of the rear end of the left front wheel 1031 in the front-rear direction of the vehicle body frame 1021. In a side view of the upright state of the vehicle body frame, an intersection of the right axis Y2 of the right side rod 1054 and the lower cross member 52 is positioned in front of the rear end of the right front wheel 1032 in the front-rear direction of the vehicle body frame 1021. Thus, it is possible to increase the stroke length of the right front wheel 1032 and the left front wheel 1031 in the up-and-down direction of the vehicle body frame 1021 due to the operation of the right shock absorbing device and the left shock absorbing device, and to prevent the increase of the movable ranges of the right front wheel 1032 and the left front wheel 1031 in the front-rear direction. By doing so, it is possible to provide the vehicle 1001 including the leanable vehicle body frame 1021 and the two front wheels 1031 and 1032 which improves the riding comfort and prevents an increase in the size of the entire vehicle 1001 in the front-rear direction.

In addition, in a side view of the upright state of the vehicle body frame, the intersection of left axis Y1 of the left side rod 1053 and the upper cross member 51 is positioned in front of the rear end of the left front wheel 1031 in the front-rear direction of the vehicle body frame 1021. In a side view of the upright state of the vehicle body frame, the intersection of the right axis Y2 of the right side rod 1054 and the upper cross member 51 is positioned in front of the rear end of the right front wheel 1032 in the front-rear direction of the vehicle body frame 1021. By doing so, it is possible to provide the vehicle 1001 including the leanable vehicle body frame 1021 and the two front wheels 1031 and 1032 which improves the riding comfort and prevents an increase in size of the entire vehicle 1001 in the front-rear direction.

The acute angle θTL defined by the expansion and contraction direction TLD of the left telescopic element 1036 and the up-and-down direction of the vehicle body frame 1021 is equivalent or substantially equivalent to the acute angle θSL defined by the left axis Y1 of the left side rod 1053 and the up-and-down direction of the vehicle body frame 1021. In addition, the rotation axis 1314 of the left front wheel is positioned in front of the left axis Y1 of the left side rod 1053. The expansion and contraction direction TLD of the left telescopic element 1036 is positioned behind the rotation axis 1314 of the left front wheel. The acute angle θTR defined by the expansion and contraction direction TRD of the right telescopic element 1038 and the up-and-down direction of the vehicle body frame 1021 is equivalent or substantially equivalent to the acute angle θSR defined by the right axis Y2 of the right side rod 1054 and the up-and-down direction of the vehicle body frame 1021. In addition, the rotation axis 1324 of the right front wheel is positioned in front of the right axis Y2 of the right side rod 1054. The expansion and contraction direction TRD of the right telescopic element 1038 is positioned behind the rotation axis 1324 of the right front wheel. By doing so, it is possible to increase the stroke length of the right telescopic element 1038 and the left telescopic element 1036, without shifting the right front wheel 1032 and the left front wheel 1031 rearward. By doing so, it is possible to improve the riding comfort and to prevent an increase in size of the entire vehicle 1001 in the front-rear direction.

Third, Fourth, Fifth, and Sixth Preferred Embodiments

FIGS. 13(a) and 13(b) are explanatory diagrams of a side view schematically showing a third preferred embodiment of the present invention and a comparative example in an upright state of a vehicle body frame. Herein, the upright state of the vehicle body frame is a state in which front wheels are not steered and the vehicle body frame is not leaned in the left-and-right direction. At that time, the right front wheel and the left front wheel have the same height in the up-and-down direction of the vehicle body frame. FIG. 13(b) is an explanatory diagram schematically showing the third preferred embodiment of the present invention. FIG. 13(a) is an explanatory diagram schematically showing the comparative example. In FIGS. 13(a), 13(b), 14(a), 14(b), 15(a), 15(b), 16(a), 16(b), 17(a), 17(b), 18(a) and 18(b), the same reference numerals have the same functions. A left-and-right direction of the vehicle body frame is shown with r and 1, a front-rear direction of the vehicle body frame is shown with f and b, and an up-and-down direction of the vehicle body frame is shown with u and d. A vehicle 2000 includes a seat 2001 for a rider to sit, and a vehicle body frame 2002 which supports the seat. In addition, the vehicle 2000 includes a right front wheel 2003R and a left front wheel 2003L which are disposed in a line in the left-and-right direction of the vehicle body frame 2002, and a rear wheel 2004.

In addition, the vehicle 2000 includes right shock absorbing devices 2005R and 2006R and left shock absorbing devices 2005L and 2006L. The right shock absorbing devices 2005R and 2006R support the right front wheel 2003R at the lower portion thereof. The right shock absorbing devices 2005R and 2006R attenuate the displacement of the right front wheel 2003R with respect to the upper portion thereof in the up-and-down direction of the vehicle body frame 2002. The left shock absorbing devices 2005L and 2006L support the left front wheel 2003L at the lower portion thereof. The left shock absorbing devices 2005L and 2006L attenuate the displacement of the left front wheel 2003L with respect to the upper portion thereof in the up-and-down direction of the vehicle body frame 2002.

The vehicle 2000 includes a link mechanism 2007. The link mechanism 2007 includes a right side rod 2008R and a left side rod 2008L. The lower portion of the right side rod 2008R is positioned in front of the upper portion thereof in the front-rear direction of the vehicle body frame 2002. The right side rod 2008R supports the upper portion of the right shock absorbing devices 2005R and 2006R to be turnable around a right axis SRA extending in the up-and-down direction of the vehicle body frame. The lower portion of the left side rod 2008L is positioned in front of the upper portion thereof in the front-rear direction of the vehicle body frame 2002. The left side rod 2008L supports the upper portion of the left shock absorbing devices 2005L and 2006L to be turnable around a left axis SLA parallel or substantially parallel with the right axis SRA. In addition, the link mechanism 2007 includes an upper cross member 2009U and a lower cross member 2009D. The upper cross member 2009U turnably supports the upper portion of the right side rod 2008R at the right end portion thereof. The upper cross member 2009U turnably supports the upper portion of the left side rod 2008L at the left end portion thereof. The intermediate portion of the upper cross member 2009U is supported by the vehicle body frame 2002 to be turnable around an upper axis UA extending in the front-rear direction of the vehicle body frame. The lower cross member 2009D turnably supports the lower portion of the right side rod 2008R at the right end portion thereof. The lower cross member 2009D turnably supports the lower portion of the left side rod 2008L at the left end portion thereof. The intermediate portion of the lower cross member 2009D is supported by the vehicle body frame 2002 to be turnable around a lower axis DA parallel or substantially parallel with the upper axis UA.

In the present preferred embodiment, the upper cross member 2009U includes a right upper cross member and a left upper cross member. The left end portion of the right upper cross member and the right end portion of the left upper cross member correspond to the intermediate portion of the upper cross member. In addition, the upper cross member and the lower cross member are preferably configured with a pair of front and rear cross members. As described above, the upper cross member and the lower cross member are preferably configured with a plurality of cross members, as long as the linkage function is included. Further, other cross members may be provided between the upper cross member and the lower cross member. It is only necessary that the link mechanism include the upper cross member and the lower cross member.

In addition, the upper axis UA and the lower axis DA extend in the front-back direction of the vehicle body frame, and incline with respect to the front-back direction. The upper axis UA and the lower axis DA incline rearward and downward. That is, the upper axis UA and the lower axis DA incline forward and upward. In the present preferred embodiment, when referring to the axis extending in the front-rear direction of the vehicle body frame, the axis is not necessarily parallel with the front-rear direction. The axis extending in a front-rear direction of the vehicle body frame preferably is an axis which is inclined in a range of about ±45°, for example, with respect to the front-rear direction. In the same manner as described above, the axis extending in an up-and-down direction of the vehicle body frame preferably is an axis which is inclined in a range of about ±45°, for example, with respect to the up-and-down direction. The axis extending in a left-and-right direction of the vehicle body frame preferably is an axis which is inclined in a range of about ±45°, for example, with respect to the left-and-right direction.

The vehicle 2000 includes a steering shaft 2010 between the right side rod 2008R and the left side rod 2008L. The steering shaft 2010 is supported by the vehicle body frame 2002. In FIG. 13(a) and FIG. 13(b), the right side rod 2008R, the left side rod 2008L, and the steering shaft 2010 overlap with each other. The upper end portion of the steering shaft 2010 is provided above the lower axis DA which is the turning axis of the lower cross member 2009D in the up-and-down direction of the vehicle body frame 2002. In addition, the lower end portion of the steering shaft 2010 is positioned in front of the upper end portion thereof in the front-rear direction of the vehicle body frame 2002. The steering shaft 2010 is able to turn around an intermediate shaft SMA extending in the up-and-down direction of the vehicle body frame 2002.

The vehicle 2000 includes a handlebar 2011 fixed to the upper end portion of the steering shaft 2010. As a rider sitting on the seat 2001 operates the handlebar 2011, the steering shaft 2010 turns. The turning of the steering shaft 2010 is transmitted to the right shock absorbing devices 2005R and 2006R and the left shock absorbing devices 2005L and 2006L through a turning transmission mechanism (not shown) including a tie rod (not shown). The right front wheel 2003R turns with the right shock absorbing devices 2005R and 2006R and the left front wheel 2003L turns with the left shock absorbing devices 2005L and 2006L. In the handlebar 2011 of the vehicle 2000 of FIG. 13(b), a position of a grip gripped by a rider is not changed, but a length in the up-and-down direction thereof is slightly smaller compared to the handlebar 2011 of the vehicle 2000 of FIG. 13(a). This is because the position of the upper end portion of the steering shaft is set on the slightly upper portion by increasing the stroke length.

The right shock absorbing device 2005R and the left shock absorbing device 2005L of the vehicle 2000 of FIG.

13(a) are the linkage type shock absorbing device as in the same manner in the vehicle disclosed in Japanese Patent Unexamined Publication JP A-2011-195099. In detail, the right shock absorbing device 2005R includes a bottom bridge 2005a which is provided below the right side rod 2008R and extends forward, a fork 2005b extending downward from the front end portion of the bottom bridge 2005a, a supporting arm 2005c which is supported with respect to the fork 2005b so as to have one end portion to be oscillated, an axle 2005d which is provided on the other end portion of the supporting arm 2005c and supports the right front wheel 2003R, and a shock absorber 2005e which is provided between the bottom bridge 2005a and the supporting arm 2005c. The left shock absorbing device 2005L is preferably also configured in the same manner as the right shock absorbing device 2005R. Since the shock absorbing devices are configured as described above, in the vehicle 2000 of FIG. 13(a), the right front wheel 2003R and the left front wheel 2003L oscillate in accordance with the oscillation of the supporting arm 2005c. The rear wheel 2004 is supported by a power unit 2012 including a power source and a transmission. The power source is preferably an engine or an electric motor, for example. In addition, the power unit 2012 is supported to be oscillated with respect to the vehicle body frame 2002. The oscillation of the power unit 2012 is attenuated by the shock absorbing device 2013 provided between the vehicle body frame 2002 and the power unit 2012.

In the same manner as in the vehicle disclosed in Japanese Patent Unexamined Publication JP A-2011-195099, in the vehicle 2000 of FIG. 13(a) in the upright state of the vehicle body frame 2002, an acute angle $\theta L$ defined by a virtual plane VP perpendicularly or substantially perpendicularly intersecting with the upper axis UA and the lower axis DA and the up-and-down direction of the vehicle body frame 2002, is equivalent or substantially equivalent to an acute angle $\theta SR$ defined by the right axis SRA of the right side rod 2008R and the up-and-down direction of the vehicle body frame 2002 and an acute angle $\theta SL$ defined by the left axis SLA of the left side rod 2008L and the up-and-down direction of the vehicle body frame 2002.

In the vehicle 2000 of FIG. 13(b), the right shock absorbing device 2006R includes a right telescopic element 2006Ra which is positioned directly in front of the vehicle body frame 2002 in the front-rear direction of the vehicle body frame 2002 and is configured to be expanded and contracted in an expansion and contraction direction extending in the up-and-down direction of the vehicle body frame 2002. The right telescopic element 2006Ra supports the right front wheel 2003R at the lower portion thereof through a right axle 2006Rb. Further, the right shock absorbing device 2006R causes the right front wheel 2003R to be displaced in the expansion and contraction direction TRD of the right telescopic element 2006Ra. The left shock absorbing device 2006L includes a left telescopic element 2006La which is positioned in front of in the front-rear direction of the vehicle body frame 2002 and can be expanded and contracted in an expansion and contraction direction extending in the up-and-down direction of the vehicle body frame 2002. The left telescopic element 2006La supports the left front wheel 2003L at the lower portion thereof through a left axle 2006Lb. Further, the left shock absorbing device 2006L causes the left front wheel 2003L to be displaced in the expansion and contraction direction TLD of the left telescopic element 2006La.

In the vehicle 2000 of FIG. 13(b) in the upright state of the vehicle body frame 2002, a size of an acute angle $\theta L$ defined by a virtual plane VP perpendicularly or substantially perpendicularly intersecting with the upper axis UA and the lower axis DA and the up-and-down direction of the vehicle body frame 2002, is smaller than sizes of an acute angle $\theta SR$ defined by the right axis SRA of the right side rod 2008R and the up-and-down direction of the vehicle body frame 2002 and an acute angle $\theta SL$ defined by the left axis SLA of the left side rod 2008L and the up-and-down direction of the vehicle body frame 2002. In addition, the size of the acute angle $\theta L$ defined by a virtual plane VP perpendicularly or substantially perpendicularly intersecting with the upper axis UA and the lower axis DA and the up-and-down direction of the vehicle body frame 2002, is smaller than sizes of an acute angle $\theta TR$ defined by the expansion and contraction direction TRD of the right telescopic element 2006Ra and the up-and-down direction of the vehicle body frame 2002 and an acute angle $\theta TL$ defined by the expansion and contraction direction TLD of the left telescopic element 2006La and the up-and-down direction of the vehicle body frame 2002. Further, the sizes of the acute angle $\theta TR$ defined by the expansion and contraction direction TRD of the right telescopic element 2006Ra and the up-and-down direction of the vehicle body frame 2002 and the acute angle $\theta TL$ defined by the expansion and contraction direction TLD of the left telescopic element 2006La and the up-and-down direction of the vehicle body frame 2002 are greater than the size of the acute angle $\theta L$ defined by a virtual plane VP perpendicularly or substantially perpendicularly intersecting with the upper axis UA and the lower axis DA and the up-and-down direction of the vehicle body frame 2002. Furthermore, the sizes of the acute angle $\theta TR$ defined by the expansion and contraction direction TRD of the right telescopic element 2006Ra and the up-and-down direction of the vehicle body frame 2002 and the acute angle $\theta TL$ defined by the expansion and contraction direction TLD of the left telescopic element 2006La and the up-and-down direction of the vehicle body frame 2002 are equivalent to or smaller than the sizes of the acute angle $\theta SR$ defined by the right axis SRA of the right side rod 2008R and the up-and-down direction of the vehicle body frame 2002 and the acute angle $\theta SL$ defined by the left axis SLA of the left side rod 2008L and the up-and-down direction of the vehicle body frame 2002.

Figure 14:
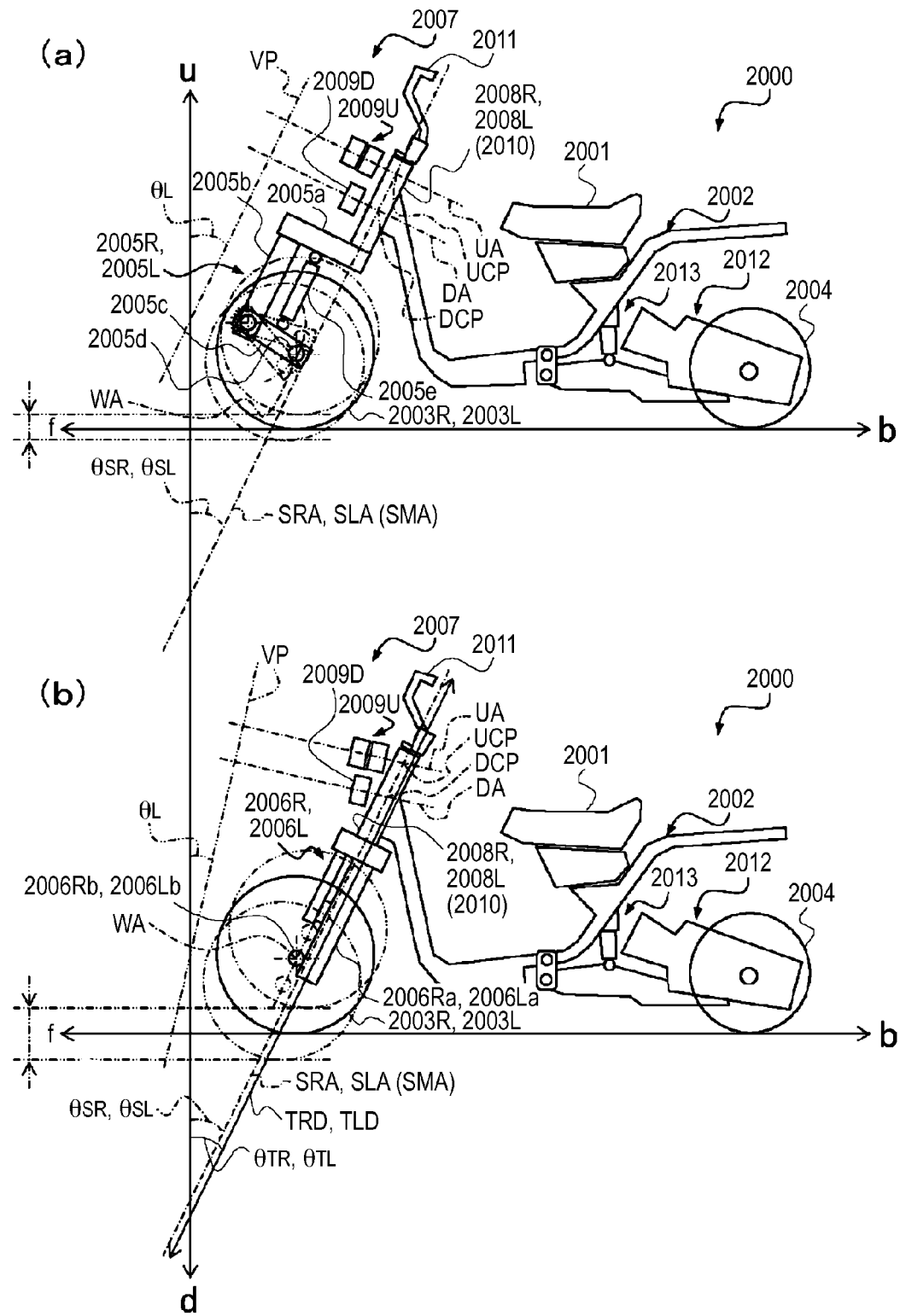
FIGS. 14(a) and 14(b) are explanatory diagrams schematically showing movable ranges of a right front wheel and a left front wheel due to an operation of a shock absorbing device in the third preferred embodiment of the present invention and the comparative example of the present invention.

FIGS. 14(a) and 14(b) are explanatory diagrams schematically showing movable ranges of the right front wheel and the left front wheel due to the operation of the shock absorbing device in the third preferred embodiment of the present invention and the comparative example. FIGS. 14(a) and 14(b) show a side of the upright state of the vehicle body frame 2002. In the same manner as the vehicle disclosed in Japanese Patent Unexamined Publication JP A-2011-195099, in the vehicle 2000 of FIG. 14(a), the right front wheel 2003R and the left front wheel 2003L oscillate in accordance with the oscillation of the supporting arm 2005c. At that time, the shock absorber 2005e is expanded and contracted in accordance with the oscillation of the supporting arm 2005c. The oscillation of the right front wheel 2003R and the left front wheel 2003L is attenuated due to the expansion and contraction of the shock absorber 2005e. Since the supporting arm 2005c is short and the shock absorber 2005e is supported by the intermediate portion of the supporting arm 2005c, the stroke of the shock absorber 2005e is short. In addition, since the supporting arm 2005c is short, the ranges of oscillation of the right front wheel 2003R and the left front wheel 2003L are also narrow. Accordingly, the movable ranges of the right front wheel 2003R and the left front wheel 2003L in the front-rear direction of the vehicle body frame 2002 due to the operation of the linkage-type shock absorbing device are small. Thus, the increase in size of the entire vehicle 2000 in the front-rear direction is prevented. However, in the linkage-type shock absorbing device, the stroke length of the right front wheel 2003R and the left front wheel 2003L in the up-and-down direction of the vehicle body frame 2002 due to the operation of the shock absorbing devices 2005R and 2005L is low. In addition, in the linkage-type shock absorbing device, since it is difficult to include a long supporting arm for oscillating the front wheels due to the structural problem, it is difficult to provide a large stroke length.

In the vehicle 2000 of FIG. 14(b), the right front wheel 2003R and the left front wheel 2003L are linearly displaced in the expansion and contraction direction TRD of the right telescopic element 2006Ra and the expansion and contraction direction TLD of the left telescopic element 2006La. Accordingly, the stroke length of the right front wheel 2003R and the left front wheel 2003L in the up-and-down direction of the vehicle body frame 2002 due to the operation of the telescopic shock absorbing devices 2005R and 2005L is large. Thus, it is possible to improve the riding comfort. However, the movable ranges of the right front wheel 2003R and the left front wheel 2003L in the front-rear direction of the vehicle body frame 2002 due to the operation of the telescopic shock absorbing devices 2006R and 2006L are large.

As described above, in general, when the telescopic elements are used and the right front wheel and the left front wheel are linearly displaced in the expansion and contraction direction of the telescopic elements, although it is possible to improve the riding comfort, but the movable ranges of the right front wheel and the left front wheel in the front-rear direction of the vehicle body frame become large. Accordingly, in the vehicle including the leanable vehicle body frame and the two front wheels provided in the commercial market, the shock absorbing devices that linearly displace the right front wheel and the left front wheel in the expansion and contraction direction of the telescopic elements are not used.

Figure 15:
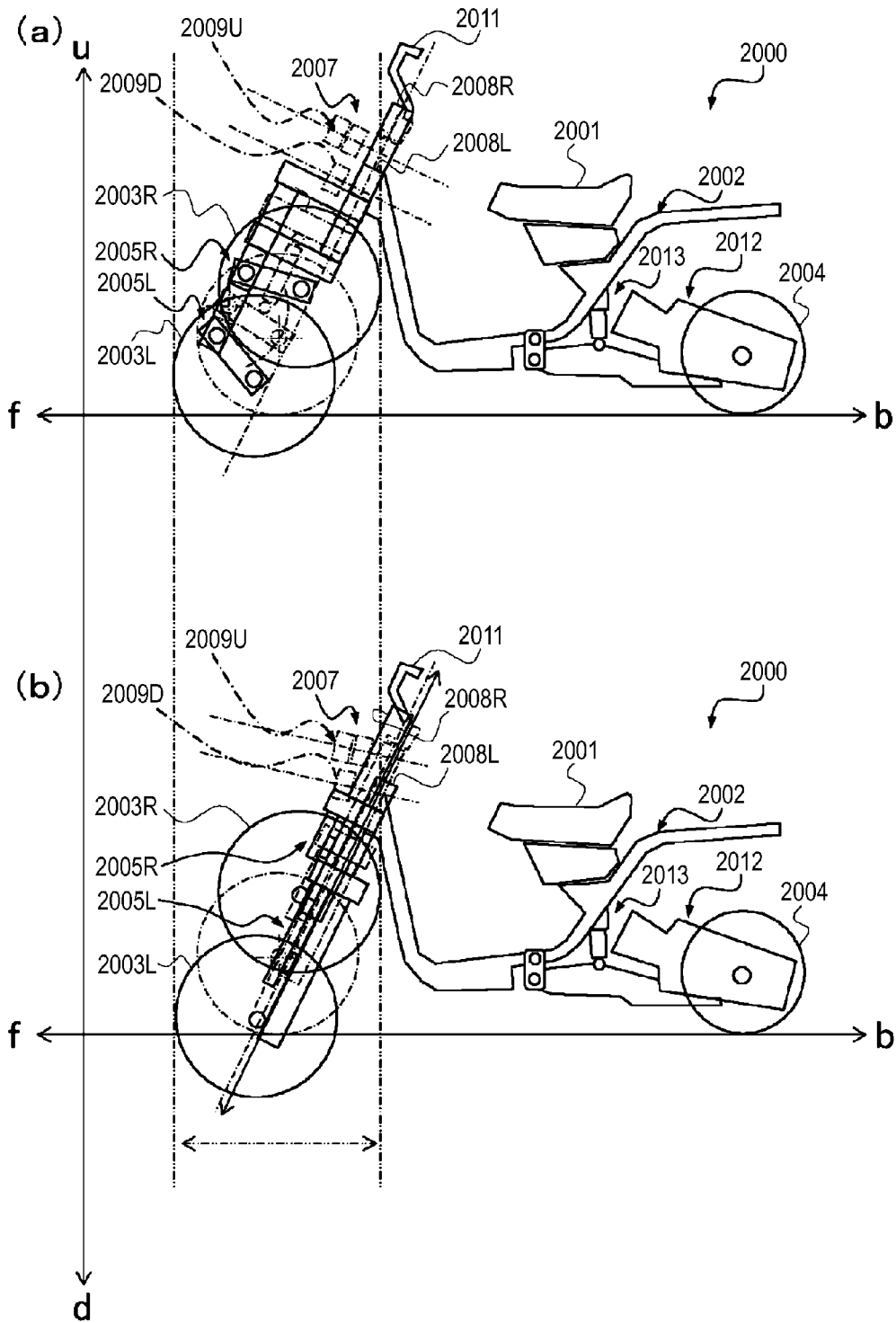
FIGS. 15(a) and 15(b) are explanatory diagrams schematically showing maximum movable ranges of the right front wheel and the left front wheel in the third preferred embodiment of the present invention and the comparative example of the present invention.

FIGS. 15(a) and 15(b) are explanatory diagrams schematically showing the maximum movable ranges of the right front wheel and the left front wheel in the third preferred embodiment and the comparative example of the present invention. FIGS. 15(a) and 15(b) show the state of the vehicle 2000 in which the vehicle body frame 2002 is leaned rightward to a maximum extent. The right front wheel 2003R is in a state where the right shock absorbing devices 2005R and 2006R are contracted to a maximum extent, and is positioned in a highest portion in the up-and-down direction of the vehicle body frame 2002 due to the operation of the link mechanism 2007. The left front wheel 2003L is in a state where the left shock absorbing devices 2005L and 2006L are contracted to a maximum extent, and is positioned in a lowest portion in the up-and-down direction due to the operation of the link mechanism 2007. The upper cross member 2009U and the lower cross member 2009D in the upright state of the vehicle body frame 2002 are shown with virtual lines, but the upper cross member 2009U and the lower cross member 2009D in the leaned state to a maximum extent are not shown for simplification of the drawings.

The movable ranges of the right front wheel 2003R and the left front wheel 2003L in the front-rear direction of the vehicle body frame 2002 of the vehicle 2000 of the comparative example shown in FIG. 15(a) and those of the right front wheel and the left front wheel of the vehicle 2000 of the third preferred embodiment shown in FIG. 15(b) are the same with each other. However, regarding the amount of displacement of the right front wheel 2003R and the left front wheel 2003L in the up-and-down direction of the vehicle body frame 2002, the amount of displacement of the vehicle 2000 of the comparative example shown in FIG. 15(a) is greater than the amount of displacement of the third preferred embodiment of the present invention shown in FIG. 15(b). As described above, in the third preferred embodiment of the present invention, it is possible to secure the large stroke length of the right front wheel 2003R and the left front wheel 2003L due to the operation of the right shock absorbing device 2006R and the left shock absorbing device 2006L, and to prevent the increase of the movable ranges of the right front wheel 2003R and the left front wheel 2003L in the front-rear direction.

In the third preferred embodiment of the present invention, since the right shock absorbing device 2006R includes the right telescopic element 2006Ra and supports the right front wheel 2003R to be movable in the expansion and contraction direction TRD of the right telescopic element 2006Ra, it is easy to increase the stroke length of the right shock absorbing device 2006R. Since the left shock absorbing device 2006L includes the left telescopic element 2006La and supports the left front wheel 2003L to be movable in the expansion and contraction direction TLD of the left telescopic element 2006La, it is easy to increase the stroke length of the left shock absorbing device 2006L. Therefore, it is possible to secure a large stroke length of the linkage-type shock absorbing devices 2005R and 2005L and to improve the riding comfort. However, when the shock absorbing devices include the telescopic elements 2006Ra and 2006La with the large stroke length, the movable ranges of the right front wheel 2003R and the left front wheel 2003L also increase.

In the third preferred embodiment of the present invention, the right front wheel 2003R and the left front wheel 2003L are supported by the lower portions of the telescopic elements 2006Ra and 2006La of the shock absorbing devices 2006R and 2006L, and are displaced with respect to the upper portions of the telescopic elements 2006Ra and 2006La in the expansion and contraction directions TRD and TLD of the telescopic elements 2006Ra and 2006La. The upper portions of the telescopic elements 2006Ra and 2006La are supported by the link mechanism 2007, and are displaced with respect to the vehicle body frame 2002 in an interlocked manner with the leaning of the vehicle body frame 2002. That is, the displacement due to the operation of the telescopic elements 2006Ra and 2006La is added to the displacement of the right front wheel 2003R and the left front wheel 2003L due to the operation of the link mechanism 2007. The inventors have discovered that the movable ranges of the right front wheel 2003R and the left front wheel 2003L as the entire vehicle 2000 are capable of being decreased by configuring the movable ranges thereof due to the operation of the shock absorbing devices 2006R and 2006L and the movable ranges thereof due to the operation of the link mechanism 2007. The right shock absorbing device 2006R and the left shock absorbing device 2006L are supported by the link mechanism 2007 and support the right front wheel 2003R and the left front wheel 2003L, respectively. Accordingly, the inventors have discovered that, the right front wheel 2003R, the left front wheel 2003L, the right shock absorbing device 2006R, and the left shock absorbing device 2006L move when the link mechanism 5 is operated, whereas the right front wheel 2003R and the left front wheel 2003L move but the link mechanism 5 does not move when the right shock absorbing device 2006R and the left shock absorbing device 2006L are operated. That is, the inventors have discovered that the movable ranges of the front wheels due to the operation of the link mechanism 2007 contributes more to the movable ranges of the right front wheel 2003R and the left front wheel 2003L of the entire vehicle 2000, compared to the movable ranges of the right front wheel 2003R and the left front wheel 2003L in the front-rear direction due to the operation of the shock absorbing devices 2006R and 2006L.

Herein, in the upright state of the vehicle body frame 2002, the size of the acute angle θL defined by a virtual plane VP perpendicularly or substantially perpendicularly intersecting with the upper axis UA and the lower axis DA and the up-and-down direction of the vehicle body frame 2002, is set to be smaller than the sizes of the acute angle θTR defined by the expansion and contraction direction TRD of the right telescopic element 2006Ra and the up-and-down direction of the vehicle body frame 2002, the acute angle θTL defined by the expansion and contraction direction TLD of the left telescopic element 2006La and the up-and-down direction of the vehicle body frame, the acute angle θSR defined by the right axis SRA of the right side rod 2008R and the up-and-down direction of the vehicle body frame 2002, and the acute angle θSL defined by the left axis SLA of the left side rod 2008L and the up-and-down direction of the vehicle body frame 2002. Thus, it is possible to increase the movable ranges of the front wheels due to the operation of the shock absorbing devices 2006R and 2006L by using the movable range of the link mechanism 2007, and to overlap the movable ranges of the front wheels due to the operation of the shock absorbing devices 2006R and 2006L with the movable range of the link mechanism 2007 as much as possible. Therefore, it is possible to decrease the movable range of the link mechanism 2007 in the front-rear direction of the vehicle body frame 2002 and to decrease the movable ranges of the right front wheel 2003R and the left front wheel 2003L in the front-rear direction of the vehicle body frame 2002.

Herein, the acute angle θTR defined by the expansion and contraction direction TRD of the right telescopic element 2006Ra and the up-and-down direction of the vehicle body frame 2002 and the acute angle θTL defined by the expansion and contraction direction TLD of the left telescopic element 2006La and the up-and-down direction of the vehicle body frame 2002 may also be set to be equivalent or substantially equivalent to the acute angle θL defined by a virtual plane VP perpendicularly or substantially perpendicularly intersecting with the upper axis UA and the lower axis DA and the up-and-down direction of the vehicle body frame 2002. However, in this case, not only are the lower portions of the telescopic elements 2006Ra and 2006La shifted behind the upper portion thereof, but the rear ends of the right front wheel 2003R and the left front wheel 2003L are also shifted rearward. Accordingly, the movable ranges of the right front wheel 2003R and the left front wheel 2003L in the front-rear direction of the vehicle body frame 2002 may be increased.

In the third preferred embodiment of the present invention, in the upright state of the vehicle body frame, the sizes of the acute angle θTR defined by the expansion and contraction direction TRD of the right telescopic element 2006Ra and the up-and-down direction of the vehicle body frame 2002 and the acute angle θTL defined by the expansion and contraction direction TLD of the left telescopic element 2006La and the up-and-down direction of the vehicle body frame 2002 are set to be greater than the size of the acute angle θL defined by a virtual plane VP perpendicularly or substantially perpendicularly intersecting with the upper axis UA and the lower axis DA and the up-and-down direction of the vehicle body frame 2002, and are set to be equivalent to or smaller than the sizes of the acute angle θSR defined by the right axis SRA of the right side rod 2008R and the up-and-down direction of the vehicle body frame 2002 and the acute angle θSL defined by the left axis SLA of the left side rod 2008L and the up-and-down direction of the vehicle body frame 2002. Therefore, even when the telescopic elements 2006Ra and 2006La with large stroke lengths are used and the displacement of the telescopic elements 2006Ra and 2006La is added to the displacement of the link mechanism 2007, it is possible to prevent the increase of the movable ranges of the right front wheel 2003R and the left front wheel 2003L in the front-rear direction of the vehicle body frame 2002. Since the entire vehicle 2000 includes the movable ranges of the right front wheel 2003R and the left front wheel 2003L due to the operation of the link mechanism 2007 and the movable ranges thereof due to the operation of the shock absorbing devices 2006R and 2006L including the telescopic elements 2006Ra and 2006La, it is possible to increase the stroke length of the right front wheel 2003R and the left front wheel 2003L in the up-and-down direction due to the operation of the shock absorbing devices 2006R and 2006L, and to prevent the increase of the movable ranges of the right front wheel 2003R and the left front wheel 2003L in the front-rear direction as the entire vehicle 2000. Since it is possible to prevent the increase of the movable ranges of the right front wheel 2003R and the left front wheel 2003L in the front-rear direction, it is possible to prevent the increase in size of the entire vehicle 2000 in the front-rear direction.

In the third preferred embodiment of the present invention, it is possible to provide the vehicle 2000 including the leanable vehicle body frame 2002 and the two front wheels 2003R and 2003L which improves a riding comfort and prevents the increase in size of the entire vehicle 2000 in the front-rear direction.

FIG. 16(a) is an explanatory diagram of a side view schematically showing the third preferred embodiment of the present invention in the upright state of the vehicle body frame. FIG. 16(b) is an explanatory diagram of a side view schematically showing a fourth preferred embodiment of the present invention in the upright state of the vehicle body frame. FIGS. 16(a) and 16(b) show the right front wheel 2003R positioned in a highest portion in the up-and-down direction of the vehicle body frame 2002 in a state where the vehicle body frame 2002 is leaned rightward to a maximum extent and the right shock absorbing device 2006R is contracted to a maximum extent, due to the operation of the link mechanism 2007, with a virtual line. In addition, the drawings also show the left front wheel 2003L positioned in a lowest portion in the up-and-down direction of the vehicle body frame 2002 in a state where the vehicle body frame 2002 is leaned rightward to a maximum extent and the left shock absorbing device 2006L is expanded to a maximum extent, due to the operation of the link mechanism 2007, with a virtual line. In FIGS. 16(a) and 16(b), the rear ends of the right front wheels 2003R positioned in the highest portion are aligned each other in the front-rear direction of the vehicle body frame 2002.

In the vehicle 2000 of the fourth preferred embodiment of the present invention shown in FIG. 16(b), an intersection DCP of right axis SRA of the right side rod 2008R, the left axis SLA of the left side rod 2008L, and a lower axis DA of the lower cross member 2009D, are positioned in front of a rear end WBE of the right front wheel 2003R and the left front wheel 2003L in the front-rear direction of the vehicle body frame 2002. Accordingly, an acute angle θSR4 defined by the right axis SRA of the right side rod 2008R and the up-and-down direction of the vehicle body frame 2002 and an acute angle θSL4 defined by the left axis SLA of the left side rod 2008L and the up-and-down direction of the vehicle body frame 2002 are smaller than an acute angle θSR3 and an acute angle θSL3 of the third preferred embodiment of the present invention shown in FIG. 16(a). In addition, sizes of an acute angle θTR4 defined by the expansion and contraction direction TRD of the right telescopic element 2006Ra and the up-and-down direction of the vehicle body frame 2002 and an acute angle θTL4 defined by the expansion and contraction direction TLD of the left telescopic element 2006La and the up-and-down direction of the vehicle body frame 2002 are also smaller than the sizes of the acute angle θTR3 and the acute angle θTL3 of the third preferred embodiment of the present invention. Accordingly, it is possible to secure the large stroke length of the right shock absorbing device 2006R and the left shock absorbing device 2006L, and to decrease the movable ranges of the right front wheel 2003R and the left front wheel 2003L in the front-rear direction. As a result, it is possible to improve the riding comfort and to decrease the size of the entire vehicle 2000 in the front-rear direction. In addition, a size of an acute angle θL4 defined by a virtual plane VP perpendicularly or substantially perpendicularly intersecting with the upper axis UA and the lower axis DA and the up-and-down direction of the vehicle body frame 2002 is also smaller than the size of the acute angle θL3 of the third preferred embodiment of the present invention. Further, in the handlebar 2011 of the vehicle 2000 of FIG. 16(b), a position of a grip gripped by a rider is not changed, but a length in the up-and-down direction thereof is slightly smaller compared to the handlebar 2011 of the vehicle 2000 of FIG. 16(a).

Figure 17:
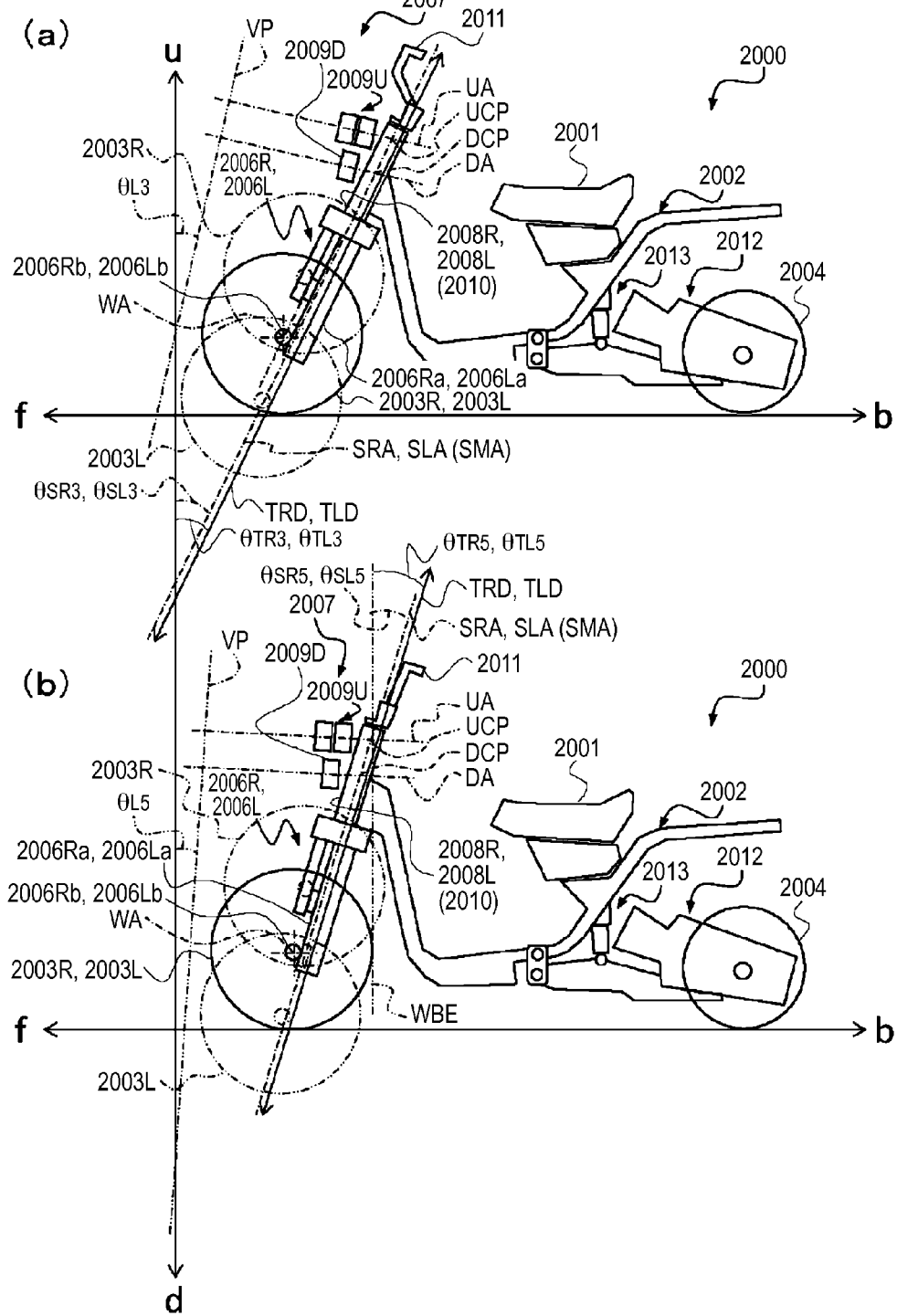
FIGS. 17(a) and 17(b) are explanatory diagrams of a side view schematically showing the third preferred embodiment and a fifth preferred embodiment of the present invention in an upright state of the vehicle body frame.

FIG. 17(a) is an explanatory diagram of a side view schematically showing the third preferred embodiment of the present invention in the upright state of the vehicle body frame. FIG. 17(b) is an explanatory diagram of a side view schematically showing a fifth preferred embodiment of the present invention in the upright state of the vehicle body frame. FIGS. 16(a) and 16(b) show the right front wheel 2003R positioned in a highest portion in the up-and-down direction of the vehicle body frame 2002 in a state where the vehicle body frame 2002 is leaned rightward to a maximum extent and the right shock absorbing device 2006R is contracted to a maximum extent, due to the operation of the link mechanism 2007, with a virtual line. In addition, the drawings also show the left front wheel 2003L positioned in a lowest portion in the up-and-down direction of the vehicle body frame 2002 in a state where the vehicle body frame 2002 is leaned rightward to a maximum extent and the left shock absorbing device 2006L is expanded to a maximum extent, due to the operation of the link mechanism 2007, with a virtual line. In 17(a) and 17(b), the rear ends of the right front wheel 2003R positioned in the highest portion are aligned each other in the front-rear direction of the vehicle body frame 2002.

In the vehicle 2000 of the fifth preferred embodiment of the present invention shown in FIG. 17(b), an intersection UCP of right axis SRA of the right side rod 2008R, the left axis SLA of the left side rod 2008L, and the axis UA of upper cross member 2009U, are positioned in front of a rear end WBE of the right front wheel 2003R and the left front wheel 2003L in the front-rear direction of the vehicle body frame. Accordingly, sizes of an acute angle θSR5 defined by the right axis SRA of the right side rod 2008R and the up-and-down direction of the vehicle body frame 2002 and an acute angle θSL5 defined by the left axis SLA of the left side rod 2008L and the up-and-down direction of the vehicle body frame 2002 are smaller than the sizes of the acute angle θSR3 and the acute angle θSL3 of the third preferred embodiment of the present invention and the acute angle θSR4 and the acute angle θSL4 of the fourth preferred embodiment of the present invention. In addition, sizes of an acute angle θTR5 defined by the expansion and contraction direction TRD of the right telescopic element 2006Ra and the up-and-down direction of the vehicle body frame 2002 and an acute angle θTL5 defined by the expansion and contraction direction TLD of the left telescopic element 2006La and the up-and-down direction of the vehicle body frame 2002 are also smaller than the sizes of the acute angle θTR3 and the acute angle θTL3 of the third preferred embodiment of the present invention and the acute angle θTR4 and the acute angle θTL4 of the fourth preferred embodiment of the present invention. Accordingly, it is possible to secure the large stroke length of the right shock absorbing device 2006R and the left shock absorbing device 2006L, and to decrease the movable ranges of the right front wheel 2003R and the left front wheel 2003L in the front-rear direction. As a result, it is possible to improve the riding comfort and to further decrease the size of the entire vehicle in the front-rear direction. In addition, a size of an acute angle θL5 defined by a virtual plane VP perpendicularly or substantially perpendicularly intersecting with the upper axis UA and the lower axis DA and the up-and-down direction of the vehicle body frame 2002 is also smaller than the sizes of the acute angle θL3 of the third preferred embodiment of the present invention and the angle θL4 of the fourth preferred embodiment of the present invention. Further, in the handlebar 2011 of the vehicle 2000 of FIG. 17(b), a position of a grip gripped by a rider is not changed, but a length in the up-and-down direction thereof is configured to be slightly smaller compared to the handlebar 2011 of the vehicle 2000 of FIG. 17(a).

FIG. 18(a) is an explanatory diagram of a side view schematically showing the third preferred embodiment of the present invention in the upright state of the vehicle body frame. FIG. 18(b) is an explanatory diagram of a side view schematically showing a sixth preferred embodiment of the present invention in the upright state of the vehicle body frame. FIGS. 18(a) and 18(b) show the right front wheel 2003R positioned in a highest portion in the up-and-down direction of the vehicle body frame 2002 in a state where the vehicle body frame 2002 is leaned rightward to a maximum extent and the right shock absorbing device 2006R is contracted to a maximum extent, due to the operation of the link mechanism 2007, with a virtual line. In addition, the drawings also show the left front wheel 2003L positioned in a lowest portion in the up-and-down direction of the vehicle body frame 2002 in a state where the vehicle body frame 2002 is leaned rightward to a maximum extent and the left shock absorbing device 2006L is expanded to a maximum extent, due to the operation of the link mechanism 2007, with a virtual line. In FIGS. 18(a) and 18(b), the rear ends of the right front wheel 2003R positioned in the highest portion are aligned each other in the front-rear direction of the vehicle body frame 2002.

In the vehicle 2000 of the sixth preferred embodiment of the present invention shown in FIG. 18(b), in the upright state of the vehicle body frame, sizes of an acute angle θTR6 defined by the expansion and contraction direction TRD of the right telescopic element 2006Ra and the up-and-down direction of the vehicle body frame 2002 and an acute angle θTL6 defined by the expansion and contraction direction TLD of the left telescopic element 2006La and the up-and-down direction of the vehicle body frame 2002 are greater than a size of an acute angle θL6 defined by a virtual plane VP perpendicularly or substantially perpendicularly intersecting with the upper axis UA and the lower axis DA and the up-and-down direction of the vehicle body frame 2002. The acute angle θL6 of the sixth preferred embodiment of the present invention is equivalent or substantially equivalent to the acute angle θL3 of the third preferred embodiment of the present invention. The sizes of the acute angle θTR6 and the acute angle θTL6 of the sixth preferred embodiment of the present invention are smaller than sizes of an acute angle θSR6 defined by the right axis SRA of the right side rod 2008R and the up-and-down direction of the vehicle body frame 2002 and an acute angle θSL6 defined by the left axis SLA of the left side rod 2008L and the up-and-down direction of the vehicle body frame 2002. The acute angle θSR6 and the acute angle θSL6 of the sixth preferred embodiment of the present invention are equivalent or substantially equivalent to the acute angle θSR3 and the acute angle θSL3 of the third preferred embodiment of the present invention. Accordingly, it is possible to secure the large stroke length of the right shock absorbing device 2006R and the left shock absorbing device 2006L, and to decrease the movable ranges of the right front wheel 2003R and the left front wheel 2003L in the front-rear direction. As a result, it is possible to improve the riding comfort and to further decrease the size of the entire vehicle in the front-rear direction. As described in the sixth preferred embodiment of the present invention, when the sizes of the acute angle θTR6 and the acute angle θTL6 of the sixth preferred embodiment of the present invention are set to be greater than the sizes of the acute angle θSR6 and the acute angle θSL6 while maintaining the large stroke length of the right shock absorbing device 2006R and the left shock absorbing device 2006L, it is necessary to provide the right front wheel 2003R and the left front wheel 2003L in even more front side. As a result, the movable ranges of the right front wheel 2003R and the left front wheel 2003L in the front-rear direction increase. Since the right front wheel 2003R and the left front wheel 2003L are provided even farther forward, the size of the entire vehicle in the front-rear direction increases. As described in the sixth preferred embodiment of the present invention, when the sizes of the acute angle θTR6 and the acute angle θTL6 of the sixth preferred embodiment of the present invention are set to be greater than the sizes of the acute angle θSR6 and the acute angle θSL6 while maintaining the position of the front wheel 2003R and the left front wheel 2003L, it is necessary to decrease the stroke length of the right shock absorbing device 2006R and the left shock absorbing device 2006L. By doing so, the movable ranges of the right front wheel 2003R and the left front wheel 2003L in the up-and-down direction due to the operation of the shock absorbing devices 2006R and 2006L decrease, and the riding comfort is deteriorated.

In the third, fourth, fifth, and sixth preferred embodiments of the present invention, in the upright state of the vehicle body frame 2002, the acute angle θTR defined by the expansion and contraction direction TRD of the right telescopic element 2006Ra and the up-and-down direction of the vehicle body frame 2002, the acute angle θTL defined by the expansion and contraction direction TLD of the left telescopic element 2006La and the up-and-down direction of the vehicle body frame 2002, the acute angle θSR defined by the right axis SRA of the right side rod 2008R and the up-and-down direction of the vehicle body frame 2002, and the acute angle θSL defined by the left axis SLA of the left side rod 2008L and the up-and-down direction of the vehicle body frame 2002 are equivalent or substantially equivalent to each other. In addition, a rotation axis WA of the right front wheel 2003R and the left front wheel 2003L is positioned in front of the right axis SRA of the right side rod 2008R and the left axis SLA of the left side rod 2008L. Further, in the front-rear direction of the vehicle body frame 2002, an expansion and contraction direction TRD of the right telescopic element 2006Ra and an expansion and contraction direction TLD of the left telescopic element 2006La are positioned behind the right axis SRA of the right side rod 2008R and the left axis SLA of the left side rod 2008L. Accordingly, it is possible to increase the stroke length of the right telescopic element 2006Ra and the left telescopic element 2006La, without shifting the right front wheel 2003R and the left front wheel 2003L rearward. As a result, it is possible to improve the riding comfort, and to prevent the increase in size of the entire vehicle 2000 in the front-rear direction. The expansion and contraction direction of the right telescopic element 2006Ra is a line existing in the right telescopic element 2006Ra through the center of the right telescopic element 2006Ra, in the expansion and contraction direction of the right telescopic element 2006Ra. In the same manner as described above, the expansion and contraction direction of the left telescopic element 2006La is a line existing in the left telescopic element 2006La through the center of the left telescopic element 2006La, in the expansion and contraction direction of the left telescopic element 2006La.

The inventors have reviewed the displacement of the right and left front wheels, in consideration of a contradiction in the increase of the stroke lengths of the right and left front wheels due to operation of the shock absorbing devices and the suppression of the movable ranges of the right and left front wheel as the entire vehicle in the front-rear direction. As a result, the inventors have discovered that the displacement due to the operation of the shock absorbing devices is added to the displacement of the right and left front wheels due to the operation of the link mechanism in the vehicle including the leanable vehicle body frame and the two front wheels and paid attention thereto. The inventors have discovered that the movable ranges of the right front wheel and the left front wheel of the entire vehicle are capable of being decreased by configuring the movable ranges thereof due to the operation of the shock absorbing devices and the movable ranges thereof due to the operation of the link mechanism. The inventors have discovered that the movable ranges of the right and left front wheels due to the operation of the link mechanism contribute more to the movable ranges of the right and left front wheels as the entire vehicle, compared to the movable ranges of the right and left front wheels in the front-rear direction due to the operation of the shock absorbing devices, since the movable ranges of the right and left front wheels due to the operation of the link mechanism are generally greater than the movable ranges of the right and left front wheels in the front-rear direction due to the operation of the shock absorbing devices. Accordingly, the inventors considered increasing the movable ranges of the front wheels due to the operation of the shock absorbing devices by using the movable range of the link mechanism, and to overlap the movable ranges of the front wheels due to the operation of the shock absorbing devices with the movable range of the link mechanism as much as possible. In addition, in order to achieve this, a positional relationship between the turning axis of the cross member of the link mechanism, the displacement direction of the right and left front wheels due to the operation of the shock absorbing devices, the expansion and contraction direction of the telescopic elements of the shock absorbing devices, and the axis of the side rod of the link mechanism turnably supporting the right and left front wheels, in the side view in the upright state of the vehicle body frame, are configured. Through such processes and configurations, the inventors have achieved preferred embodiments of the present invention.

The size of the acute angle in the preferred embodiments of the present invention preferably is an angle including 0° and smaller than 90°. In general, the acute angle does not include 0°, but in the preferred embodiment of the present invention, the acute angle includes 0°. In the examples, the virtual plane perpendicularly or substantially perpendicularly intersecting with the upper axis and the lower axis of the cross member is a plane extending rearward and upward. However, there is no limitation, and the virtual plane perpendicularly or substantially perpendicularly intersecting with the upper axis and the lower axis of the cross member may be a plane extending forward and upward.

The vehicle according to a preferred embodiment of the present invention is a vehicle including a leanable vehicle body frame and two front wheels. The number of rear wheels is not limited to one, and may be two. In addition, a vehicle body cover configured to cover the vehicle body frame may be included. The vehicle body cover configured to cover the vehicle body frame may not be included. The power source is not limited to the engine, and an electric motor may be used.

The terms and expressions used herein are used for describing various preferred embodiments of the present invention, and are not to be subject to limited interpretation. Various modifications within the range of claims of the present application are possible and permissible, without excluding any equivalents to the content disclosed herein.

The present invention can be realized with many different preferred embodiments. These disclosures are to provide the preferred embodiments of the principle of the present invention. Various preferred embodiments with the drawings are disclosed herein, with the understanding that the preferred embodiments are not intended to limit the present invention to the preferred embodiments disclosed herein and/or preferred embodiments described with the drawings.

Several preferred embodiments with the drawings of the present invention are disclosed herein. The present invention is not limited to the various preferred embodiments disclosed herein. The present invention include various preferred embodiments including equivalent elements, modifications, deletions, combinations (for example, combinations of features of various preferred embodiments), improvements and/or changes which can be recognized by a person skilled in the art based on this disclosure. Specific matters in the claims are to be broadly interpreted based on terms used in the claims, and are not to be limited to the present specification or the preferred embodiments disclosed herein or discussed during prosecution of the present application. Such preferred embodiments are non-exclusive. For example, in this disclosure, the terms "preferred" and "preferable" are non-exclusive term and indicate that "it is preferred but there is no limitation" or "it is preferable but there is no limitation".

This application claims priority to Japanese Patent Application (Japanese Patent Application No. 2012-209873) filed Sep. 24, 2012 and Japanese Patent Application (Japanese Patent Application No. 2013-138483) filed Jul. 1, 2013, the contents of which are each incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a vehicle body frame;
   a right front wheel and a left front wheel disposed in a line in a left-and-right direction of the vehicle body frame;
   a right shock absorbing device supporting the right front wheel at a lower portion thereof and configured to attenuate displacement of the right front wheel with respect to an upper portion thereof in an up-and-down direction of the vehicle body frame;
   a left shock absorbing device supporting the left front wheel at a lower portion thereof and configured to attenuate displacement of the left front wheel with respect to an upper portion in the up-and-down direction of the vehicle body frame;
   a link mechanism including:
      a right side rod including a lower portion positioned in front of an upper portion thereof in a front-rear direction of the vehicle body frame, and supporting the upper portion of the right shock absorbing device to be turnable around a right axis extending in the up-and-down direction of the vehicle body frame;
      a left side rod including a lower portion positioned in front of an upper portion thereof in the front-rear direction of the vehicle body frame, and supporting the upper portion of the left shock absorbing device to be turnable around a left axis parallel or substantially parallel with the right axis;
      an upper cross member including a right end portion turnably supporting the upper portion of the right side rod, a left end portion turnably supporting the upper portion of the left side rod, and an intermediate portion supported by the vehicle body frame to be turnable around an upper axis extending in the front-rear direction of the vehicle body frame; and
      a lower cross member including a right end portion turnably supporting the lower portion of the right side rod, a left end portion turnably supporting the lower portion of the left side rod, and an intermediate portion supported by the vehicle body frame to be turnable around a lower axis parallel or substantially parallel with the upper axis; and
   a steering shaft supported by the vehicle body frame between the right side rod and the left side rod in the left-and-right direction of the vehicle body frame, turnable around an intermediate axis extending in the up-and-down direction of the vehicle body frame, including an upper end portion provided above the lower axis which is a turning axis of the lower cross member in the up-and-down direction of the vehicle body frame, and including a lower end portion provided in front of the upper end portion thereof in the front-rear direction of the vehicle body frame; wherein
   the right shock absorbing device includes a right telescopic element positioned directly in front of the vehicle body frame in the front-rear direction and configured to expand or contract in an expansion and contraction direction extending in the up-and-down direction of the vehicle body frame, and to cause the right front wheel to be displaced in the expansion and contraction direction of the right telescopic element;

the left shock absorbing device includes a left telescopic element positioned directly in front of the vehicle body frame in the front-rear direction and configured to expand or contract in the expansion and contraction direction extending in the up-and-down direction of the vehicle body frame, and to cause the left front wheel to be displaced in the expansion and contraction direction of the left telescopic element;

in an upright state of the vehicle body frame, an acute angle θL defined by a virtual plane perpendicularly or substantially perpendicularly intersecting with the upper axis and the lower axis and the up-and-down direction of the vehicle body frame is smaller than an acute angle θTR defined by the expansion and contraction direction of the right telescopic element and the up-and-down direction of the vehicle body frame, an acute angle θTL defined by the expansion and contraction direction of the left telescopic element and the up-and-down direction of the vehicle body frame, an acute angle θSR defined by the right axis of the right side rod and the up-and-down direction of the vehicle body frame, and an acute angle θSL defined by the left axis of the left side rod and the up-and-down direction of the vehicle body frame; and in the upright state of the vehicle body frame, the acute angle θTR and the acute angle θTL are greater than the acute angle θL, and are equivalent to or smaller than the acute angle θSR and the acute angle θSL.

2. The vehicle according to claim 1, wherein, in a side view of the upright state of the vehicle body frame, an intersection of the right axis of the right side rod and the lower axis of the lower cross member is positioned in front of a rear end of the right front wheel in the front-rear direction of the vehicle body frame and an intersection of the left axis of the left side rod and the lower axis of the lower cross member is positioned in front of a rear end of the left front wheel in the front-rear direction of the vehicle body frame.

3. The vehicle according to claim 1, wherein, in a side view of the upright state of the vehicle body frame, an intersection of the right axis of the right side rod and the upper axis of the upper cross member is positioned in front of a rear end of the right front wheel in the front-rear direction of the vehicle body frame and an intersection of the left axis of the left side rod and the upper axis of the upper cross member is positioned in front of a rear end of the left front wheel in the front-rear direction of the vehicle body frame.

4. The vehicle according to claim 1, wherein, in the upright state of the vehicle body frame, the acute angle θTR, the acute angle θTL, the acute angle θSR, and the acute angle θSL are equivalent or substantially equivalent to each other, rotation axes of the right front wheel and the left front wheel are positioned in front of the right axis of the right side rod and the left axis of the left side rod, and the expansion and contraction direction of the right telescopic element and the expansion and contraction direction of the left telescopic element are positioned in front of the right axis of the right side rod and the left axis of the left side rod in the front-rear direction of the vehicle body frame.

* * * * *